US008769227B2

(12) United States Patent
Mogi et al.

(10) Patent No.: US 8,769,227 B2
(45) Date of Patent: Jul. 1, 2014

(54) STORAGE CONTROLLER AND DATA MANAGEMENT METHOD

(71) Applicants: Katsuo Mogi, Odawara (JP); Koji Nagata, Kaisei (JP); Shoji Kodama, Sagamihara (JP); Ikuya Yagisawa, Machida (JP)

(72) Inventors: Katsuo Mogi, Odawara (JP); Koji Nagata, Kaisei (JP); Shoji Kodama, Sagamihara (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/754,299

(22) Filed: Jan. 30, 2013

(65) Prior Publication Data

US 2013/0145110 A1 Jun. 6, 2013

Related U.S. Application Data

(60) Division of application No. 12/457,622, filed on Jun. 17, 2009, now Pat. No. 8,370,590, which is a continuation of application No. 11/358,051, filed on Feb. 22, 2006, now Pat. No. 7,565,501.

(30) Foreign Application Priority Data

Jan. 13, 2006 (JP) .................................. 2006-005580

(51) Int. Cl.
*G06F 12/00* (2006.01)
(52) U.S. Cl.
USPC ........................................................ 711/162

(58) Field of Classification Search
USPC ......................................................... 711/162
See application file for complete search history.

(56) References Cited

U.S. PATENT DOCUMENTS

| | | | |
|---|---|---|---|
| 6,131,148 A | 10/2000 | West et al. |
| 6,397,308 B1 | 5/2002 | Ofek et al. |
| 6,434,681 B1 | 8/2002 | Armangau |
| 6,981,114 B1 | 12/2005 | Wu et al. |
| 7,363,446 B2 | 4/2008 | Higaki et al. |
| 2004/0030727 A1 | 2/2004 | Armangau et al. |
| 2004/0199733 A1 | 10/2004 | Watanabe et al. |

(Continued)

FOREIGN PATENT DOCUMENTS

| | | |
|---|---|---|
| JP | 11-259348 A | 9/1999 |
| JP | 2000-036823 A | 2/2000 |

(Continued)

OTHER PUBLICATIONS

European Patent Office extended European search report on Application No. 06255659.2 dated Jul. 16, 2010: 3 pages.

(Continued)

*Primary Examiner* — Matthew Bradley
(74) *Attorney, Agent, or Firm* — Foley & Lardner LLP

(57) ABSTRACT

This storage controller providing a volume for storing data transmitted from a host system includes a management unit for managing the data written in the volume with a first block area, or a second block area in the first block area which is smaller than the first block area; a snapshot acquisition unit for acquiring a snapshot of the volume at a prescribed timing; and a transfer unit for transferring the data of the volume acquired with the snapshot of the snapshot acquisition unit to an external device with the first block area or the second block area.

20 Claims, 17 Drawing Sheets

(56) References Cited

U.S. PATENT DOCUMENTS

| | | |
|---|---|---|
| 2005/0210193 A1 | 9/2005 | Nagata |
| 2005/0210209 A1 | 9/2005 | Nagata |
| 2005/0210210 A1 | 9/2005 | Arai et al. |
| 2005/0216682 A1 | 9/2005 | Shinozaki et al. |
| 2005/0289309 A1 | 12/2005 | Suzuki |
| 2006/0041727 A1 | 2/2006 | Adkins et al. |
| 2006/0069889 A1 | 3/2006 | Nagaya et al. |
| 2006/0248125 A1 | 11/2006 | Kawamura |

FOREIGN PATENT DOCUMENTS

| | | |
|---|---|---|
| JP | 2000-293434 A | 10/2000 |
| JP | 2005-267569 A | 9/2005 |
| JP | 2005-275494 A | 10/2005 |
| JP | 2005-293469 A | 10/2005 |
| JP | 2005-309828 A | 11/2005 |

OTHER PUBLICATIONS

European Search Report dated May 21, 2007.
Office Action, with partial English translation, for Japanese Patent Application No. 2006-005580, dated Apr. 12, 2011 (8 pages).

- 200 INTERNAL COPY EXECUTION PROGRAM
- 210 REMOTE COPY EXECUTION PROGRAM
- 220 CONTROL PROGRAM
- 230 VOLUME MANAGEMENT TABLE
- 240 HASH MANAGEMENT TABLE
- 250 COMMAND EXECUTION PROGRAM
- 260 COMPILED COMMUNICATION EXECUTION PROGRAM

230

| VOL-ID | PATH INFORMATION | VOL TYPE | POOL VOL FLAG | PAIR INFORMATION (EX:PAIR PARTNER INFORMATION, PAIR STATUS) |
|---|---|---|---|---|
| 1 | ... | PRIMARY VOL | 0 | .... |
| 2 | - | - | 1 | .... |
| 3 | - | - | 1 | .... |
| 4 | - | - | 1 | .... |
| . | . | . | . | . |
| . | . | . | . | . |
| . | . | . | . | . |

FIG.5

| | ACTION | PRIMARY VOL | VIRTUAL VOL | SNAPSHOT MANAGEMENT INFORMATION | SECONDARY VOL | VIRTUAL VOL |
|---|---|---|---|---|---|---|
| TIME t0 | SPLIT TIME OF PRIMARY VOLUME AND VIRTUAL VOLUME | IMAGE T0 [A] | IMAGE T0 (SIZE=0) | INFORMATION FOR RESTORING IMAGE T0 | — | — |
| TIME t1 | EXECUTE REMOTE COPY | IMAGE T1 [B] | IMAGE T0 [A] | INFORMATION FOR RESTORING IMAGE T0 | — | — |
| TIME t2 | COMPLETE REMOTE COPY | IMAGE T2 [B] [C] | IMAGE T0 [A] | INFORMATION FOR RESTORING IMAGE T0 | IMAGE T0 [A] | — |
| TIME t3 | SPLIT TIME OF PRIMARY VOLUME AND VIRTUAL VOLUME | IMAGE T3 [B] [D] | IMAGE T3 (SIZE=0) | INFORMATION FOR RESTORING IMAGE T3 | IMAGE T0 [A] | — |
| TIME t4 | EXECUTE REMOTE COPY | IMAGE T4 [B] [E] | IMAGE T3 [D] | INFORMATION FOR RESTORING IMAGE T3 | IMAGE T0 [A] | — |
| TIME t5 | COMPLETE REMOTE COPY | IMAGE T5 [F] [E] | IMAGE T3 [B] [D] | INFORMATION FOR RESTORING IMAGE T3 | IMAGE T3 [B] [D] | IMAGE T3 [A] |
| TIME t6 | SPLIT TIME OF PRIMARY VOLUME AND VIRTUAL VOLUME | IMAGE T6 [G] [E] | IMAGE T6 (SIZE=0) | INFORMATION FOR RESTORING IMAGE T6 | IMAGE T3 [B] [D] | IMAGE T3 [A] |
| ... | ... | ... | ... | ... | ... | ... |

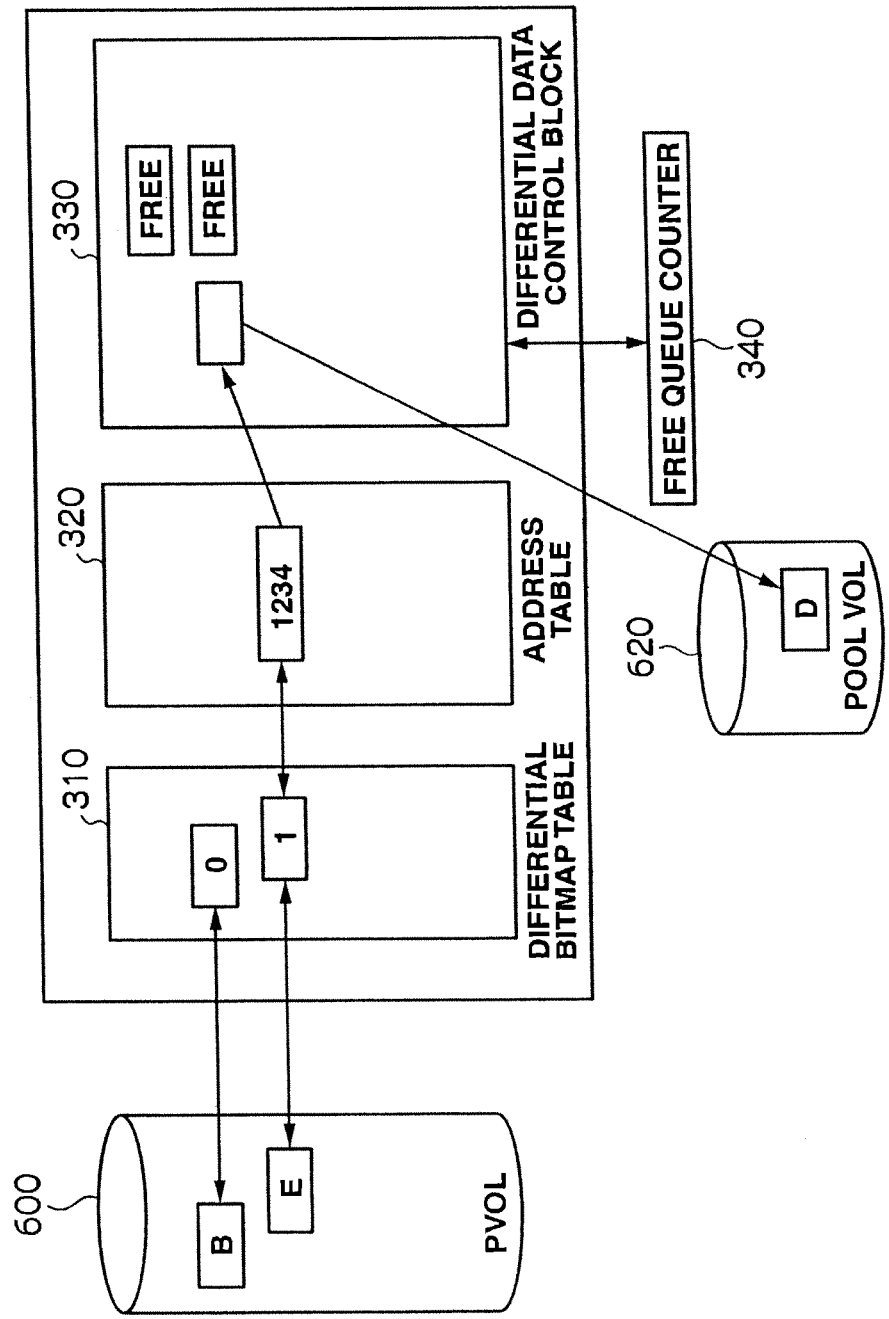

STORAGE CONTROLLER AND DATA MANAGEMENT METHOD

CROSS-REFERENCE TO RELATED PATENT APPLICATIONS

Japan Priority Application 2006-005580, filed Jan. 13, 2006 including the specification, drawings, claims and abstract, is incorporated herein by reference in its entirety. This application is a Divisional of U.S. application Ser. No. 12/457,622, filed Jun. 17, 2009, incorporated herein by reference in its entirety, which is a Continuation of U.S. application Ser. No. 11/358,051, filed Feb. 22, 2006, incorporated herein by reference in its entirety.

BACKGROUND

The present invention relates to a storage controller and its data management method, and, for instance, can be suitably applied to a storage system that replicates a volume of a storage controller storing data transmitted from a host system in another storage controller.

Conventionally, known is technology for managing the backup of a volume of a storage controller (hereinafter referred to as a "primary storage controller") storing data transmitted from a host system operated in a certain site for disaster recovery of the storage system in a volume of a storage controller (hereinafter referred to as a "secondary storage controller") established at a remote site (this technology is hereinafter referred to as "remote copying"), and various other related technologies have been proposed.

For example, in Japanese Patent Laid-Open Publication No. H11(1999)-259348, the primary storage controller has at least one volume and transmits a request for acquiring at least a part of the snapshot of such volume to a secondary storage controller, and the secondary storage controller replies to the request for acquiring the snapshot and has a volume which is a replicated copy of the volume of the primary storage controller, and the volume of the primary storage controller is replicated in the volume of the secondary storage controller by acquiring the snapshot of the corresponding portion.

Further, for instance, in Japanese Patent Laid-Open Publication No. 2005-267569, the storage controller controls the reading and writing of data from and in a first volume, controls the data newly stored in the volume to be written in a second volume as differential data per generation, and manages differential data by providing, in an area of a memory, a snapshot management table managing the relationship of differential data per generation stored in the second volume. And, the storage controller generates a virtual volume of a specific generation with the snapshot management table, and thereby performs remote copying with this virtual volume.

Moreover, for example, in Japanese Patent Laid-Open Publication No. 2005-275494, the secondary storage controller receives difference-related information from the primary storage controller, generates generation management information based on the received difference-related information, and restores the stored contents of the designated generation based on the generated generation management information and the volume of the secondary storage controller.

SUMMARY

Meanwhile, with this kind of storage system, in order to avoid the management bit of data of the volume acquired with the snapshot in the primary storage controller from becoming insufficient, this management bit is managed in a data size of a sufficiently large differential management unit in comparison to the data transferred from the host system to the primary storage controller.

Nevertheless, with this kind of storage system, since the data size of the data transferred from the host system to the primary storage controller is smaller in comparison to the data size of the differential management unit, when transferring the data, which was transferred from the host system, from the primary storage controller to the secondary storage controller, even though the data size of the data transferred from the host system to the primary storage controller is small, such data must be transferred in the data size of the differential management unit.

Thus, with this kind of storage system, in comparison to the data transfer from the host system to the primary storage controller, the data transfer from the primary storage controller to the secondary storage controller becomes slower, and differential data awaiting transfer from the primary storage controller to the secondary storage controller may become accumulated in the primary storage controller.

Meanwhile, with this kind of storage system, when the data size of the differential management unit is made to be small, the management bit count for managing the differential data must be increased, and an enormous memory capacity will become required for retaining such management bit.

The present invention was devised in view of the foregoing points, and an object thereof is to provide a storage controller and data management method capable of effectively preventing the increase in memory capacity and dramatically improving the transfer efficiency of data.

In order to achieve the foregoing object, the present invention provides a storage controller providing a volume for storing data transmitted from a host system, including: a management unit for managing the data written in the volume with a first block area, or a second block area in the first block area which is smaller than the first block area; a snapshot acquisition unit for acquiring a snapshot of the volume at a prescribed timing; and a transfer unit for transferring the data of the volume acquired with the snapshot of the snapshot acquisition unit to an external device with the first block area or the second block area.

Therefore, when the data to be transferred to the external device in the first block area is small, data traffic can be reduced by transferring data with the second block area, and, when the data to be transferred to the external device in the first block area is large, the number of second block areas to be managed can be reduced by transferring data with the first block area.

Further, the present invention also provides a data management method of a storage controller providing a volume for storing data transmitted from a host system, including: a first step for managing the data written in the volume with a first block area, or a second block area in the first block area which is smaller than the first block area; a second step for acquiring a snapshot of the volume at a prescribed timing; and a third step for transferring the data of the volume acquired with the snapshot of the snapshot acquisition unit to an external device with the first block area or the second block area.

Therefore, when the data to be transferred to the external device in the first block area is small, data traffic can be reduced by transferring data with the second block area, and, when the data to be transferred to the external device in the first block area is large, the number of second block areas to be managed can be reduced by transferring data with the first block area.

According to the present invention, since a storage controller providing a volume for storing data transmitted from a host system includes a management unit for managing the data written in the volume with a first block area, or a second block area in the first block area which is smaller than the first block area; a snapshot acquisition unit for acquiring a snapshot of the volume at a prescribed timing; and a transfer unit for transferring the data of the volume acquired with the snapshot of the snapshot acquisition unit to an external device with the first block area or the second block area, when the data to be transferred to the external device in the first block area is small, data traffic can be reduced by transferring data with the second block area, and, when the data to be transferred to the external device in the first block area is large, the number of second block areas to be managed can be reduced by transferring data with the first block area. As a result, provided is a storage controller and data management method capable of effectively preventing the increase in memory capacity and dramatically improving the transfer efficiency of data.

DESCRIPTION OF DRAWINGS

FIG. 5 is a conceptual diagram for explaining the asynchronous remote copying processing sequence;

FIG. 6 is a conceptual diagram for explaining the outline of the snapshot update processing;

DETAILED DESCRIPTION

An embodiment of the present invention is now explained with reference to the drawings.

(1) Configuration of Storage System in Present Embodiment

Figure 1:
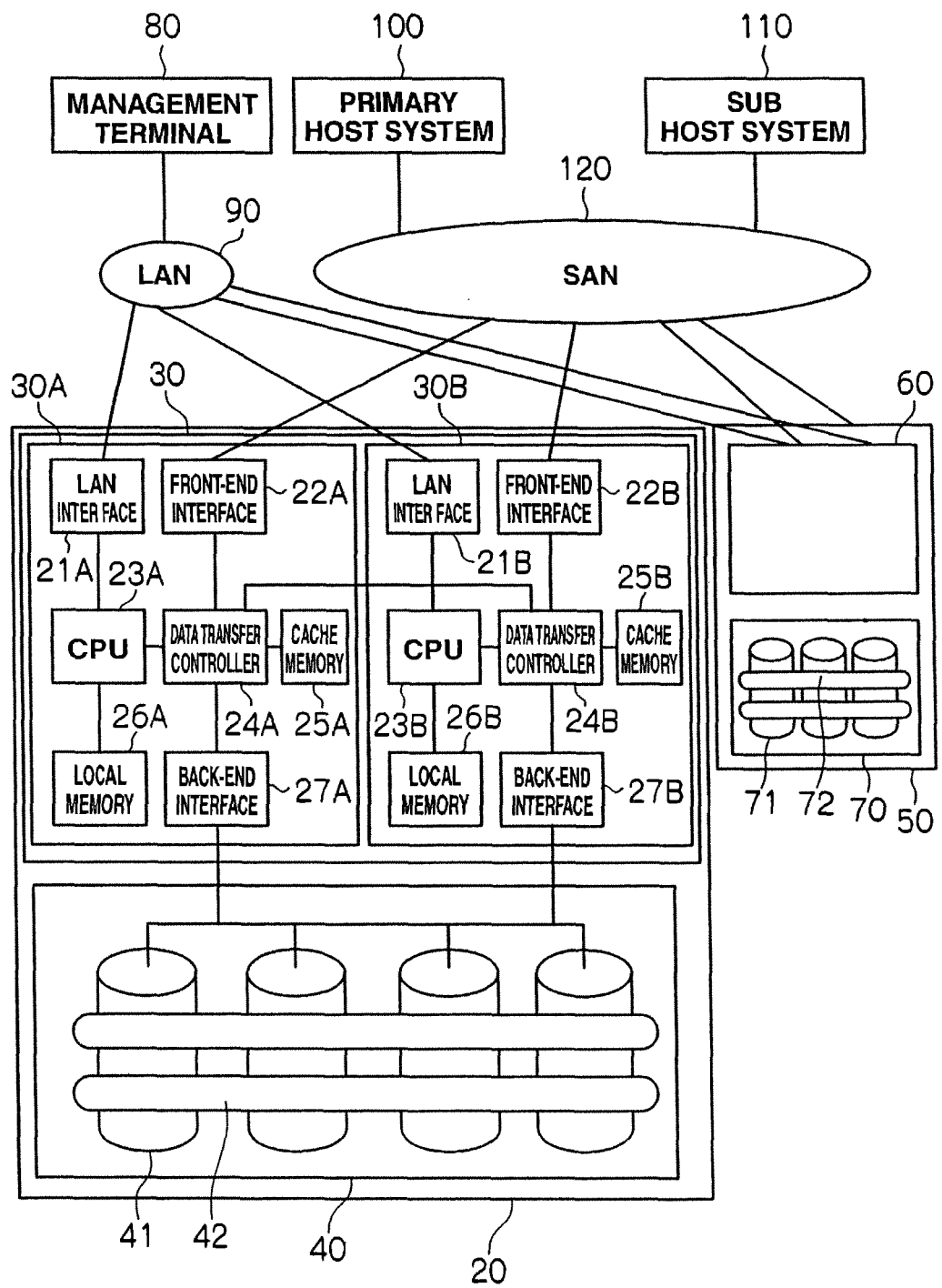
FIG. 1 is a schematic diagram showing a configuration of the storage system according to the present embodiment.

FIG. 1 is the system configuration of a storage system 10 according to the present embodiment. The storage system 10 comprises a first storage controller 20 and a second storage controller 50. The first storage controller 20, second storage controller 50, a primary host system 100 and a secondary host system 110 are interconnected via a SAN (Storage Area Network) 120.

The primary host system 100 is a regular-use host system, and primarily requests the first storage controller 20 to perform I/O processing when the system is normal. The secondary host system 110 is a standby host system, and primarily requests the second storage controller 50 to perform I/O processing when a failure occurs in the system, and takes over the processing performed by the primary host system 100 when a failure occurs. The primary host system 100 and secondary host system 110, for instance, are a personal computer, workstation, mainframe computer or the like.

The storage system 10 is configured such that data written in the first storage controller 20 is remote copied in the second storage controller 50. The second storage controller 50 retains the data image that is the same as the data image previously retained by the first storage controller 20.

Thereby, even when a failure occurs in the first storage controller 20, the system can be operated by using the second storage controller 50.

As the remote copying, on the condition that data is written in both the first storage controller 20 and second storage controller 50, this may be a synchronous copy of reporting the write completion to the primary host system 100, or an asynchronous copy of reporting the write completion to the primary host system 100 at the stage when data is written in the first storage controller 20, and transferring such data to the second storage controller 50 at a suitable timing.

In the following explanation, examples are shown where the first storage controller 20 is operated as the operative primary storage controller, and the second storage controller 50 is operated as the standby secondary storage controller.

The first storage controller 20 primarily has a controller 30 and a storage apparatus system 40. The controller 30 is configured from two controllers; namely, controllers 30A and 30B for the improvement of reliability.

The controller 30A has a LAN (Local Area Network) interface 21A, a front-end interface 22A, a CPU 23A, a data transfer controller 24A, a cache memory 25A, a local memory 26A and a back-end interface 27A. The detailed configuration of the controller 30B is the same as the detailed configuration of the controller 30A described above. Incidentally, when an indication is made without adding the subscripts of "A" and "B", it means that either controller 30A or 30B may be used, and shows that one of the controllers is being used.

The controller 30 is capable of controlling a plurality of disk drives 41 at a RAID level (for instance, level 0, 1 or 5) prescribed in a so-called RAID system. In the RAID system, a plurality of disk drives 41 are managed as a single RAID group. A plurality of logical volumes 42, which are access units from the primary host system 100, are defined in the RAID group. The respective logical volumes 42 are assigned a LUN (Logical Unit Number).

The CPU 23 is a processor for controlling the processing of an I/O command (write command or read command) to the plurality of disk drives 41 in response to the data I/O request from the primary host system 100.

The local memory 26 stores various micro programs, a volume management table, a hash management table and so on. Details regarding the various micro programs, volume management table and hash management table will be described later. The local memory 26 is configured as a volatile memory capable of high-speed access for reading/writing.

The cache memory 25 is a buffer memory for temporarily storing write data to be written in the disk drive 41 and read data to be read from the disk drive 41. The cache memory 25 has a backup power source, and is configured as an involatile memory for preventing the loss of cache data even when a power source failure occurs in the first storage controller 20.

The data transfer controller 24 interconnects the cache memory 25, front-end interface 22, back-end interface 27 and CPU 23, and controls the data transfer between the primary host system 100 and disk drive 41.

Further, the data transfer controller 24 is communicably connected to another data transfer controller 24, and is able to transfer write commands, read commands, write data and read data to and from the other data transfer controller 24.

When a write command transmission request is made from the primary host system 100, the data transfer controller 24 writes the data received from the primary host system 100 via the front-end interface 22 in the cache memory 25, and, for the purpose of asynchronously writing such write data in the disk drive 41, it thereafter transfers such write data to the back-end interface 27.

Further, the data transfer controller 24 transfers the data received from the primary host system 100 via the front-end interface 22 to the other data transfer controller 24. And, the other data transfer controller 24 writes the received data in the cache memory 25 of the controller.

Like this, by dual writing the write data received from the primary host system 100 in the cache memory 25 upon receiving a write command from the primary host system 100, even when a failure occurs in one of the controllers among the controllers 30, the other controller is able to continue performing processing.

Further, upon receiving a read command from the primary host system 100, the read data read from the disk drive 41 via the back-end interface 27 is written in the cache memory 25, and such read data is transferred to the front-end interface 22.

The front-end interface 22 is a controller for controlling the interface with the primary host system 100, and, for instance, has a function of receiving a block access request from the primary host system 100 based on a fibre channel protocol.

The back-end interface 27 is a controller for controlling the interface with the disk drive 41, and, for instance, has a function of controlling the data I/O request to the disk drive 41 based on a protocol for controlling the disk drive 41.

The LAN interface 21 is an interface to be connected to the LAN 90, and controls the transmission/reception of data and control signals with the management terminal 80 based on TCP/IP.

The storage apparatus system 40 has a plurality of disk drives 41. The disk drive 41 is a storage device such as a FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SAS (Serial Attached SCSI) disk drive or SCSI (Small Computer System Interface) disk drive.

The first storage controller 20 is connected to the management terminal 80 via the LAN (Local Area Network) 90. The management terminal 80, for instance, is a computer system including hardware resources such as a CPU, memory, display and so on. The system administrator transmits a command for managing the first storage controller 20 to the first storage controller 20 by performing input operations with the management terminal 80.

As a command for managing the first storage controller 20, for example, this may be a command for increasing or decreasing the storage device 41 or changing the RAID configuration, a command for setting a communication path between the primary host system 100 and first storage controller 20, a command for installing the micro program of the CPU 23 in the memory 26, a command for confirming the operation status of the first storage controller 20 or specifying the failed portion, and so on.

The second storage controller 50 primarily has a controller 60 and a storage apparatus system 70. The detailed configuration of the controller 60 is the same as the detailed configuration of the controller 30 described above. The controller 60 is configured from two controllers; namely, controllers 60A and 60B for the improvement of reliability.

The controller 60A has a LAN interface 61A, a front-end interface 62A, a CPU 63A, a data transfer controller 64A, a cache memory 65A, a local memory 66A, and a back-end interface 67A. The detailed configuration of the controller 30B is the same as the detailed configuration of the controller 60A described above. Incidentally, when an indication is made without adding the subscripts of "A" and "B", it means that either controller 60A or 60B may be used, and shows that one of the controllers is being used. The storage apparatus system 70 has a plurality of disk drives 71.

The controller 60 is capable of controlling a plurality of disk drives 71 at a RAID level (for instance, level 0, 1 or 5) prescribed in a so-called RAID system. In the RAID system, a plurality of disk drives 71 are managed as a single RAID group. A plurality of logical volumes 72, which are access units from the secondary host system 110, are defined in the RAID group. The respective logical volumes 72 are assigned a LUN (Logical Unit Number).

Figures 2, 3:
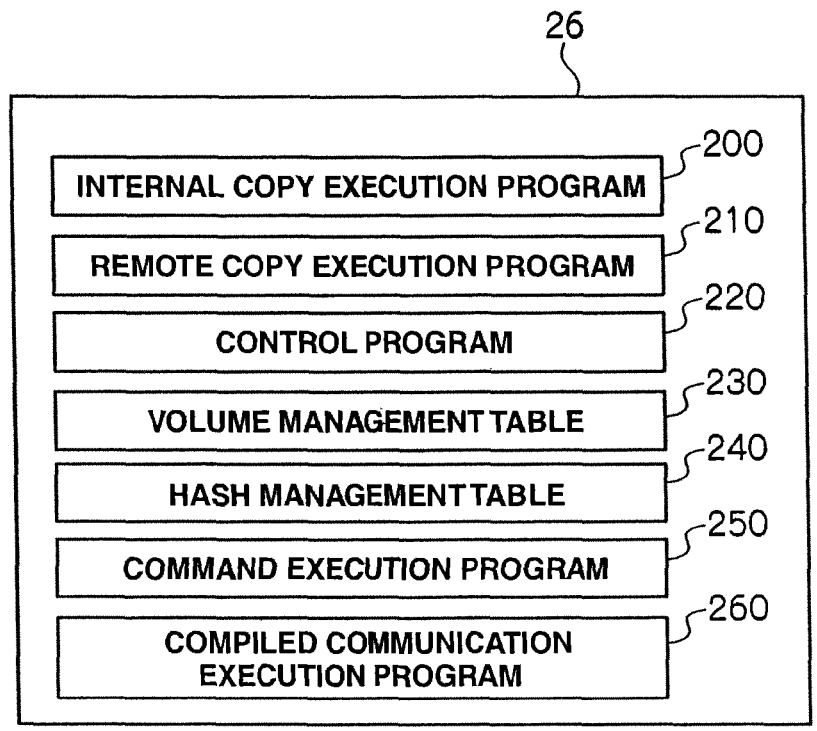
FIG. 2 is a schematic diagram showing a configuration of the local memory.
FIG. 3 is a conceptual diagram for explaining the volume management table.

FIG. 2 shows various micro programs, a volume management table and a hash management table. The local memory 26 stores an internal copy execution program 200, a remote copying execution program 210, a control program 220, a volume management table 230, a hash management table 240, a command job priority execution program 250, and a collective communication execution program 260. Incidentally, the local memory 66 does not store the hash management table 240 and command job priority execution program 250.

The internal copy execution program 220 executes internal copy processing and snapshot update processing. The remote copying execution program 210 executes remote copying. The control program 220 controls the internal copy execution program 200 and remote copying execution program 210. The volume management table 230 stores information concerning the plurality of logical volumes 42. Incidentally, the hash management table 240, command job priority execution program 250 and collective communication execution program 260 will be described later.

FIG. 3 shows a table configuration of the volume management table 230. The volume management table 230 associates and stores a VOL-ID for identifying a logical volume (hereinafter sometimes abbreviated as "VOL") regarding the respective plurality of logical volumes 42, path information showing the access path to the logical volume, type of such logical volume (hereinafter referred to as the "VOL type"), a flag showing whether the logical volume is a pool VOL (hereinafter referred to as the "pool VOL flag"), and information concerning the VOL pair containing the logical volume (hereinafter referred to as the "pair information"). At least one of the information elements (for instance, VOL-ID, VOL type, pool VOL flag) among the information stored in the volume management table 230 is input form the management terminal 80 or primary host system 100.

As the VOL type, for instance, there is "primary", "secondary" and "pool". The "primary" type VOL (hereinafter referred to as a "primary VOL" or "PVOL") is a VOL that becomes the copy source in copy processing (for example, in remote copy processing). The "secondary" type VOL (hereinafter referred to as a "secondary VOL" or "SVOL") is a VOL that becomes the copy destination in copy processing (for example, in remote copy processing).

The secondary VOL has a storage capacity that is at least greater than the capacity of the primary VOL. The primary VOL and secondary VOL both have defined path information. However, the "pool" type VOL (hereinafter referred to as a "pool VOL") does not have defined path information. Details regarding the pool VOL are described later.

The pool VOL flag shows whether the corresponding logical volume is a pool VOL. Specifically, for example, if the pool VOL flag is "1", the corresponding logical volume is a pool VOL, and, if the pool VOL flag is "0", the corresponding logical volume is not a pool VOL.

Pair information, for instance, contains pair partner information and pair status. Pair partner information includes, for example, as information relating to a logical volume to become a pair partner (hereinafter referred to as a "pair partner VOL"), the ID of the storage controller having a pair partner VOL, VOL-ID of the pair partner VOL, path information and so on. As the pair status, for example, there are "SMPL", "COPY", "PAIR", "PSUS", "SPLIT", "SSWS" and so on.

"SMPL" shows a state where there is no primary/secondary relationship before the generation of a pair.

"COPY" shows a state of forming a copy of data of the primary VOL in the secondary VOL. In "COPY", writing of data in the secondary VOL is prohibited.

"PAIR" shows a state of performing asynchronous copying from the primary VOL to the secondary VOL. In "PAIR", writing of data in the secondary VOL is prohibited.

"PSUS" shows a state where asynchronous copying from the primary VOL to the secondary VOL is suspended. In "PSUS", reading/writing of data from and in the secondary VOL is prohibited.

"SPLIT" shows a state of logically separating the primary VOL and secondary VOL, and copying only the differential data before and after the update of the primary VOL in the secondary VOL.

"SSWS" shows a state where the reading/writing of data is enabled in the secondary VOL. In "SSWS", data of the secondary VOL is restored to the previously determined contents, and the primary VOL changes to "PSUS".

By the CPU 23 referring to the volume management table 230, it is able to specify the type of logical volume 42 to be accessed and the pair information. Further, when the pool VOL is assigned to the virtual VOL described later, the CPU 23 is able to define information representing the path to such pool VOL, and register the defined path information in the volume management table 230.

Further, the CPU 23 is able to change the pool VOL to an unused state by erasing the path information regarding the pool VOL that is no longer assigned. The CPU 23 is able to determine whether each pool VOL is being used or in an unused state depending on whether path information is registered in the respective pool VOLs.

Figure 4:
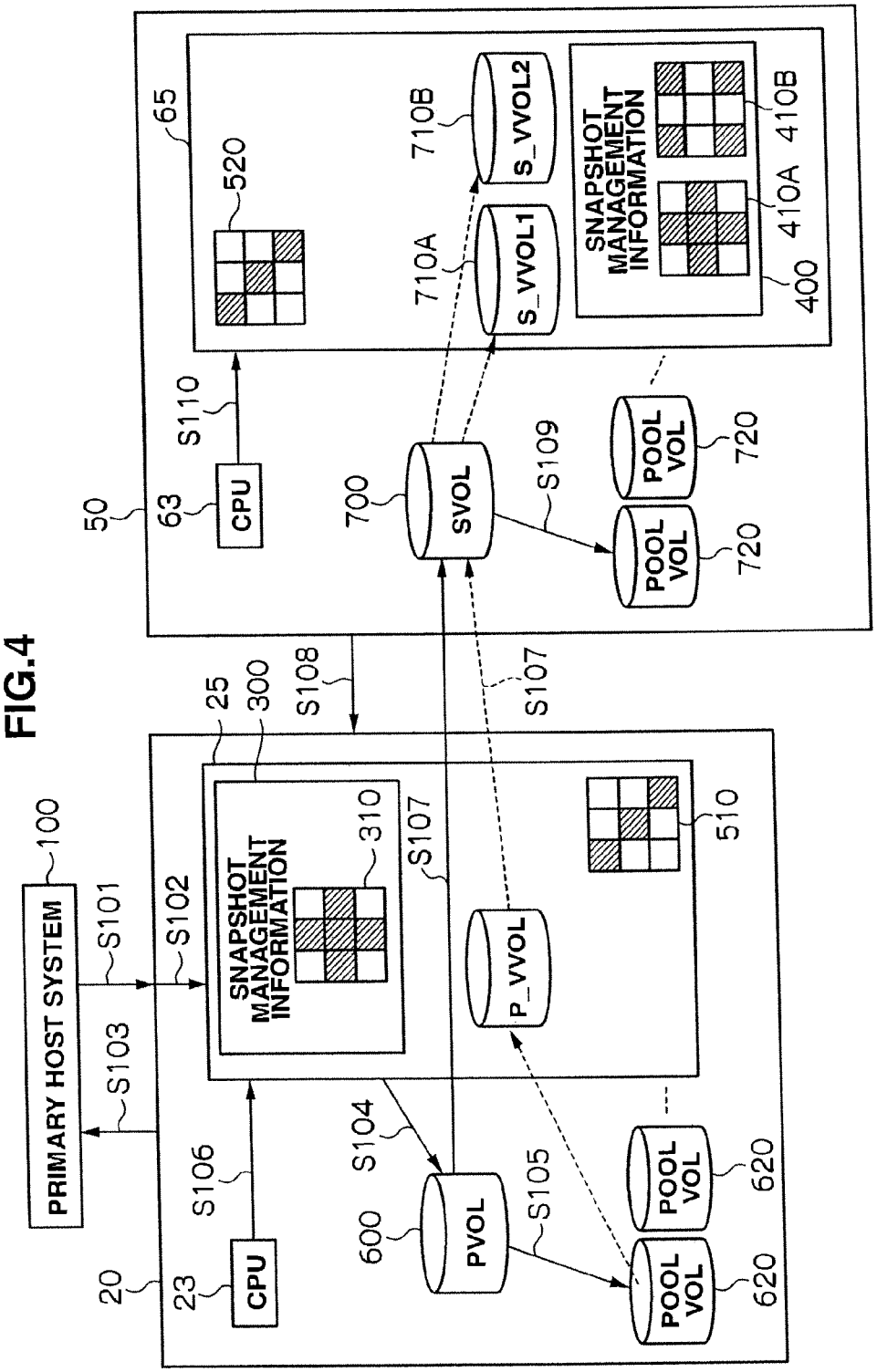
FIG. 4 is a conceptual diagram for explaining the outline of the asynchronous remote copying processing.

FIG. 4 shows the outline of the asynchronous remote copying processing to be executed with the first storage controller 20. The first storage controller 20 has a CPU 23, a cache memory 25, a primary VOL 600, a virtual VOL 610, a plurality of pool VOLs 620, snapshot management information 300, and a transfer differential bitmap table 510.

The pool VOL 620 is a logical volume for saving the differential data before and after the update when the data image of the primary VOL 600 is updated after the point in time when the pair status of the primary VOL 600 and virtual VOL 610 is split.

The virtual VOL 610 is a virtual logical volume for restoring the data image of the primary VOL 600 at a certain time from the data stored in the primary VOL 600 at a certain time and the data saved from the primary VOL 600 to the pool VOL 620 at a certain time.

The virtual VOL 610 is capable of logically retaining a snapshot of the primary VOL 600. The virtual VOL 610 is capable of forming a pair with the primary VOL 600 or secondary VOL 700.

In the present embodiment, although a case is explained where the virtual VOL 610 is formed in a storage area of the cache memory 25, it may also be formed in a storage area of the disk drive 41. For the sake of convenience of explanation, the virtual VOL 610 is sometimes abbreviated as P_VVOL.

The CPU 23 is able to select one or more pool VOLs 620 (for instance, unused pool VOLs not associated with any VOL) from among a plurality of pool VOLs 620 to the virtual VOL 610, and assign the selected one or more pool VOLs 620 to the virtual VOL 610. The CPU 23 is able to appropriately increase or decrease the number of pool VOLs 620 to be assigned to the virtual VOL 610 according to the consumption status of the storage resource.

The snapshot management information 300 is information for restoring the data image of the primary VOL 600 at a certain time using a snapshot. The CPU 23, by referring to the snapshot management information 300, is able to determine whether each data configuring the data image of the primary VOL 600 at a certain time exists in the pool VOL 620 or in the primary VOL 600, and, by acquiring data from the determined VOL, is able to restore the data image of the primary VOL 600 at a certain time in the virtual VOL 610. The snapshot management information 300 includes a differential bitmap table 310 showing the data update position of the primary VOL 600.

The transfer differential bitmap table 510 shows the position of the differential data (that is; the data update position of the primary VOL 600) to be remote copied to the secondary VOL 700 when data of the primary VOL 600 is updated after data of the primary VOL 600 is initially copied in the secondary VOL.

The CPU 23 is able to make the pair status between the primary VOL 600 and virtual VOL 610 a copy status. If data is written in the primary VOL 600 when the pair status between the primary VOL 600 and virtual VOL 610 is a copy status, the CPU 23 writes such data in the virtual VOL 610 or pool VOL 620.

The CPU 23 is able to make the pair status between the primary VOL 600 and virtual VOL 610 a split status. If data is written in the primary VOL 600 when the pair status between the primary VOL 600 and virtual VOL 610 is a split status, the CPU 23 operates the internal copy program 200 and executes internal copy processing and snapshot update processing.

The second storage controller 50 has a CPU 63, a cache memory 65, a secondary VOL 700, a plurality of virtual VOLs 710A, 710B, a plurality of pool VOLs 720, snapshot management information 400, and a transfer differential bitmap table 520.

The pool VOL 720 is a logical volume for saving the differential data before and after the update when the data image of the secondary VOL 700 is updated after the point in time the pair status of the secondary VOL 700 and virtual VOL 710A or virtual VOL 710B is split.

The virtual VOLs 710A, 710B are virtual logical volumes for restoring the data image of the secondary VOL 700 at a certain time from data stored in the secondary VOL 700 at a certain time and data saved from the secondary VOL 700 to the virtual VOLs 710A, 710B at a certain time. The virtual VOLs 710A, 710B are capable of logically retaining a snapshot of the secondary VOL 700.

In the present embodiment, although a case is explained where the virtual VOLs 710A, 710B are formed in a storage area of the cache memory 65, these may also be formed in a storage area of the disk drive 71. For the sake of convenience of explanation, the virtual VOLs 710A, 710B are sometimes abbreviated as S_VVOL.

The snapshot management information 400 is information for restoring the data image of the secondary VOL 700 at a certain time using a snapshot. The CPU 63, by referring to the snapshot management information 400, is able to determine whether each data configuring the data image of the secondary VOL 700 at a certain time exists in the pool VOL 720 or in the secondary VOL 700, and, by acquiring data from the determined VOL, is able to restore the data image of the secondary VOL 700 at a certain time in the virtual VOLS 710A, 710B. The snapshot management information 400 includes differential bitmap tables 410A, 410B showing the data update position of the secondary VOL 700.

The transfer differential bitmap table 520 shows the position where the data of the primary VOL 600 has been updated based on remote copying when data of the primary VOL 600 is updated after data of the primary VOL 600 is initially copied in the secondary VOL.

Next, the internal copy processing, snapshot update processing, and remote copy processing are explained in detail. The following explanation is based on the premise that the pair status between the primary VOL 600 and virtual VOL 610 is a split status.

When the first storage controller 20 receives a write command from the primary host system 100 (S101), it stores the write data in the cache memory 25 (S102), and reports the write completion to the primary host system 100 (S103).

The CPU 23 reads the written write data from the cache memory 25 and writes it into the primary VOL 600 (S104). Here, the CPU 23 migrates the unupdated data (data before being updated (overwritten) with the write data and which is past data that was written in the primary VOL 600) from the primary VOL 600 to the pool VOL 620 (S105). In this specification, the processing of migrating the unupdated data to the pool VOL is referred to as the "snapshot update processing".

When the pair status between the primary VOL 600 and virtual VOL 610 is a split status and internal copying is executed, the respective data configuring the data image of the primary VOL 600 at a certain time are distributed to the primary VOL 600 and pool VOL 620.

Next, the CPU 23 updates the snapshot management information 300 to information for restoring the data image of the primary VOL 600 at the split point based on the data stored in the primary VOL 600 at the point in time when the pair status between the primary VOL 600 and virtual VOL 610 is split (hereinafter referred to as the "split point"), and the data migrated from the primary VOL 600 to the pool VOL 620 after such split point (S106). As a result of this snapshot update processing, the virtual VOL 610 is able to logically retain a snapshot of the primary VOL 600.

When the pair status between the primary VOL 600 and virtual VOL 610 is a split status, the CPU 23 repeatedly executes the foregoing processing steps of S102 to S106 each time it receives a write command from the primary host system 100.

The CPU 23 operates the remote copying execution program 210 after the lapse of a predetermined time from the split point, and thereby executes remote copy processing. The remote copying execution program 210 merges the differential bitmap table 310 to the transfer differential bitmap table 510.

And, based on the transfer differential bitmap table 510, the remote copying execution program 210 determines whether each data for restoring the data image of the primary VOL 600 at the split point exists in the primary VOL 600 or in the pool VOL 620, acquires data from the determined VOL, and transfers such data to the second storage controller 50 (S107). As a result of this remote copy processing, the data image of the primary VOL 600 at the split point is reproduced in the secondary VOL 700.

When the second storage controller 50 receives data from the first storage controller 20, it reports the write completion to the first storage controller 20 (S108).

Incidentally, with the first storage controller 20, by dual writing the virtual VOL 610, snapshot management information 300, and transfer differential bitmap table 510 in the cache memories 25A, 25B, even if a failure occurs in one of the controllers among the controllers 30, the CPU of the other controller is able to continue performing the internal copy processing, snapshot update processing, and remote copy processing.

Thereafter, when the CPU 63 is to write the data received from the first storage controller 20 in the secondary VOL 700, it migrates the unupdated data (data before being updated (overwritten) with the write data and which is past data that was written in the primary VOL 700) from the secondary VOL 700 to the pool VOL 720 (S109).

Further, the CPU 63 updates the snapshot management information 400 to information for restoring the data image of the secondary VOL 700 at a split point based on the data stored in the secondary VOL 700 at a split point, and the data migrated from the secondary VOL 700 to the pool VOL 720 after the split point (S110).

Incidentally, the CPU 63 alternately switches and uses the virtual VOLS 710A, 710B. Thereby, for instance, the CPU 63 is able to logically create a snapshot of the secondary VOL 700 in the virtual VOL 710A while clearing the differential bitmap table 410B. The clearance of the differential bitmap tables 410A, 410B requires a long time. By alternately switching and using the virtual VOLs 710A, 710B, this is efficient since the processing for creating the snapshot and the processing for clearing the differential bitmap tables 410A, 410B can be performed in parallel.

Incidentally, with the second storage controller 50, by dual writing the virtual VOLs 710A, 710B, snapshot management information 400, and transfer differential bitmap table 520 in the cache memories 65A, 65B, even if a failure occurs in one of the controllers among the controllers 60, the CPU of the other controller is able to continue performing the internal copy processing, snapshot update processing, and remote copy processing.

FIG. 5 shows the processing sequence of asynchronous remote copying to be executed in the first storage controller 20. Time t0 shows the split point when the pair status between the primary VOL 600 and virtual VOL 610 is split. The data image of the primary VOL 600 at time t0 is referred to as the "image T0". The image T0 is the data image in which the data block A is stored in the first block area of the primary VOL 600. At this time t0, the unupdated data is not stored in the pool VOL 620. The snapshot management information 300 is information for restoring the image T0.

At time t1 (in other words, during the split status period), when the data block B is overwritten in the first block area of the primary VOL 600, the data image of the primary VOL 600 changes from the image T0 to the image T1. Here, the internal copy execution program 200 writes the data block A (unupdated data) from the primary VOL 600 in the virtual VOL 620, and updates the snapshot management information 300 to information showing that the first block area of the primary VOL 600 has been updated, and that the data block A (unupdated data) existing in such first block area has been stored in the virtual VOL 620.

Further, at time t1, the control program 220 commands the remote copying execution program 210 to execute remote copy processing. The remote copying execution program 210, by referring to the transfer differential bitmap table 510, specifies that the data block A configuring the image T0 exists in the virtual VOL 610, acquires the data block A from the virtual VOL 610, and transmits the data block A to the second storage controller 50.

Time t2 is the point in time when the remote copy processing is completed. As a result, the image T0 formed in the primary VOL 600 at time to is replicated in the secondary VOL 700.

Further, at time t2 (in other words, during the split status period), when the data block C is overwritten in the second block area of the primary VOL 600, the data image of the primary VOL 600 changes from the image T1 to the image T2. Here, the internal copy execution program 200 updates the snapshot management information 300 showing that the second block area of the primary VOL 600 has been updated.

For example, when the data block D is overwritten in the second block area of the primary VOL 600 after time t2 and before time t3, the data image of the primary VOL 600 changes from the image T2 to the image T3 (data image in which the data block B exists in the first block area and the data block D exists in the second block area).

Here, the internal copy execution program 200 migrates the data block C (unupdated data) from the primary VOL 600 to the pool VOL 620, and updates the snapshot management information 300 to information showing that the second block area of the primary VOL 600 has been updated, and that the data block C existing in such second block area has been stored in the virtual VOL 620.

Thereafter, before the primary VOL 600 is updated, at time t3, the primary VOL 600 and virtual VOL 610 become a split status once again.

At time t3, in other words, when the status becomes a split status, the CPU 23 deletes all updated data stored in the pool VOL 620 for the purpose of logically retaining the image T3 of the primary VOL 600 in the virtual VOL 610 at such time t3.

Further, the CPU 23 updates the snapshot management information 300 to information for restoring the image T3 from information for restoring the image T0. Specifically, for instance, at time t3, since it is a status where an update has not yet been made in the primary VOL 600, the CPU 23 updates the snapshot management information 300 to information showing that the update has not been made in the primary VOL 600.

When the data block E is overwritten in the second block area of the primary VOL 600 at time t4, the data image of the primary VOL 600 changes from the image T3 to the image T4. Here, the internal copy execution program 200 writes the data block D (unupdated data) from the primary VOL 600 in the virtual VOL 610, and updates the snapshot management information 300 to information showing that the second block area of the primary VOL 600 has been updated, and that the data block D existing in the second block area has been migrated to the pool VOL 620.

Remote copy processing is performed at time t4. The remote copying execution program 210, by referring to the transfer differential bitmap table 510, grasps that the data block B configuring the image T3 exists in the primary VOL 600 since the first block area of the primary VOL 600 has not been updated, and, since the second block area of the primary VOL 600 has been updated, it further grasps that the different data block D configuring the image T3 exists in the pool VOL 620. The remote copying execution program 210 acquires the data block B from the primary VOL 600, further acquires the data block D from the pool VOL 620, and transfers the data block B and data block D to the second storage controller 50.

Time t5 is the point in time when the remote copy processing is completed. As a result, the image T0 in the secondary VOL 700 is updated to the image T3 of the primary VOL 600 at time t3. In other words, the data block B is overwritten on the data block A of the first block area of the secondary VOL 700, and the data block D is further overwritten in the second block area of the secondary VOL 700.

Incidentally, thereafter, the second storage controller 50 stores the image T3 during the period until it receives the data configuring the image T6 of the subsequent split point t6.

Thereafter, the foregoing processing steps executed at time t3 to time t5 are repeated.

In other words, with the first storage controller 20, the primary VOL 600 and virtual VOL 610 periodically or irregularly become a split status. During the split status period and up to the point in time until the next split status (in other words, in parallel with the internal copy processing and snapshot update processing), the remote copy processing is executed. After the point in time when this remote copy processing is completed, the primary VOL 600 and virtual VOL 610 become a split status once again, and the unupdated data is deleted from the pool VOL 620.

As a result of repeating the foregoing processing, the data image (in the example of FIG. 5, image T0 at time t0, image T3 at time t3, image T6 at time t6) of the primary VOL 600 at a periodical or irregular split point can be logically retained in the virtual VOL 610, and such data image can be copied to the secondary VOL 700.

FIG. 6 shows the outline of the snapshot update processing pertaining to the present embodiment, and, specifically shows the state where the data image of the primary VOL 600 changes from the image T3 to the image T4, and the image T3 being logically retained by the virtual VOL 610.

The snapshot management information 300 includes a differential bitmap table 310, an address table 320, and a differential data control block 330.

The differential bitmap table 310 has a plurality of bits respectively corresponding to a plurality of block areas (for example, 1 block area is 64K bytes) in the primary VOL 600. For example, when changing from the image T3 to the image T4, as shown in FIG. 6, since the first block area of the primary VOL 600 is not updated, the bit corresponding to this first block area remains to be "0", and the data block E is overwritten on the data block D of the second block area. Thus, the bit corresponding to this second block area is changed from "0" to "1"

The address table 320 has address areas respectively corresponding to the plurality of block areas of the primary VOL 600. If an unupdated data corresponding to a certain block area exists, stored in an address corresponding to such certain block area is an address corresponding to such address area and which is an address in the differential data control block 330.

The differential data control block 330, for example, has management areas respectively corresponding to the plurality of block areas in the pool VOL 620. Each of the management areas records which unupdated data stored in a position corresponding to the block area in the pool VOL 620 is the snapshot data of which generation. The CPU 23 is able to acquire unupdated data of a plurality of generations by tracking back the management area.

Incidentally, an area not being used by the differential data control block 330 is managed as an empty queue. The empty queue is managed with an empty queue counter 340.

According to the foregoing configuration, the data image of the primary VOL 600 at the point in time a snapshot is created can be logically copied in the virtual VOL 610. And, regarding which data in the virtual VOL 610 is the unupdated data of which generation is managed by the differential data control block 330.

(2) Processing of Write Data in Present Embodiment
(2-1) Management Processing of Write Data Using Differential Bitmap Table 310 and Hash Management Table 240 of Present Embodiment Next, the management processing of write data using the differential bitmap table 310 and hash management table 240 in the storage system 10 according to the present embodiment is explained. The storage system 10 of the present embodiment is characterized in that it manages the write data with a block area (first data management unit) and an area that is smaller in comparison to such block area (second data management unit).

Figure 7:
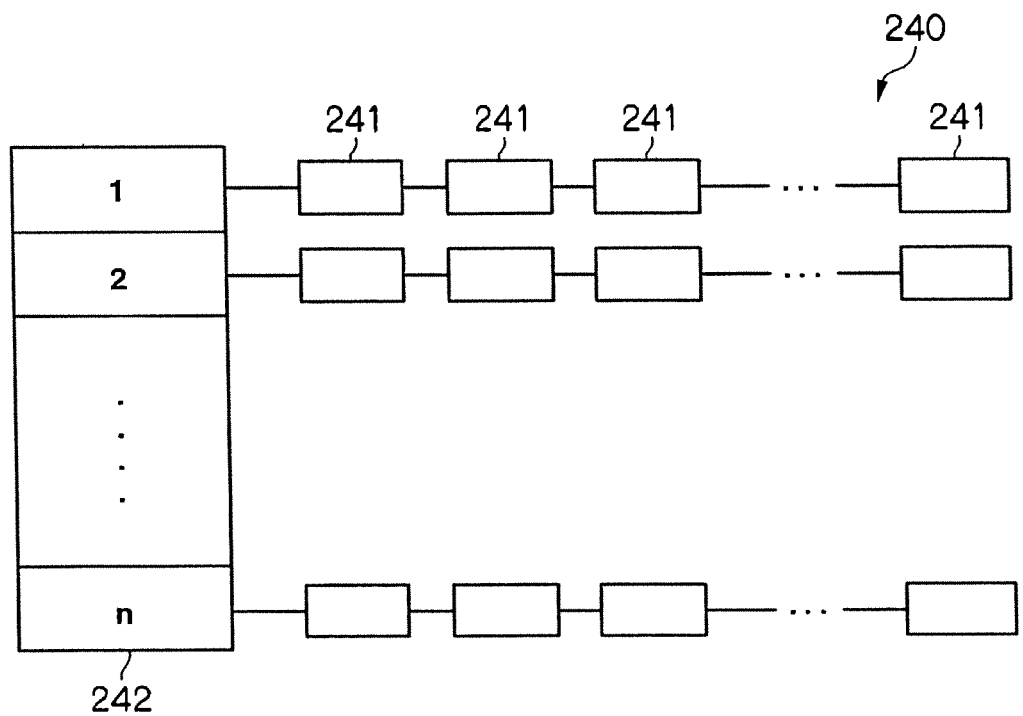
FIG. 7 is a conceptual diagram for explaining the hash management table.

FIG. 7 shows the table configuration of the hash management table 240. The hash management table 240 is configured by management information 241 for managing the write data in an area that is smaller in comparison to the block area (this is hereinafter referred to as a "small block area") (for instance, the minimum unit of one small block area is 512 bytes) being associated in order from the top address of the top address unit 242 for searching such management information 241.

Figure 8:
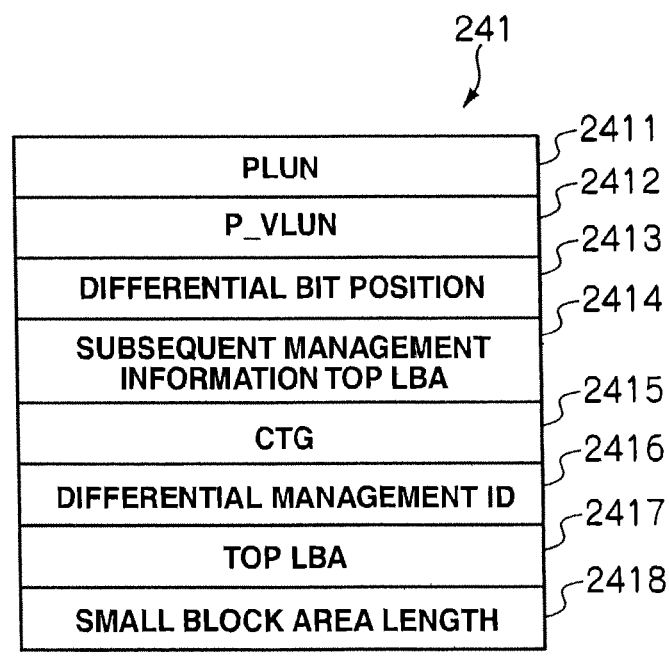
FIG. 8 is a conceptual diagram for explaining management information.

FIG. 8 shows the configuration of the management information 241. The management information 241 stores PLUN 2411 representing a LUN of the primary VOL 600, P_VLUN 2412 representing a LUN of the virtual VOL 610, difference bit position 2413 representing the position of the bit in the differential bitmap table 310, subsequent management information top LBA 2414 representing a top LBA (Logical Brock Address) of a small block area in the block area of the management information 241 to be associated subsequently, CTG 2415 representing the consistency group of the primary VOL 600, difference management ID 2416 representing a difference management ID (Identification) of the hash management table 240, top LBA 2417 representing the top LBA of the small block area in the block area, and small block area length 2418 representing the size of the small block area from the top LBA 2417.

In the hash management table 240, the top address of the top address unit 242 is configured by associating it with the number of the bit position of the differential bitmap table 310.

Further, upon associating the management information 241, the hash management table 240 searches the top address of the top address unit 242 associating the management information from the difference bit position 2413 of the management information 241.

And, the hash management table 240 manages the management information 241 by associating it with the top address of the top address unit 242 searched from the difference bit position 2413 of the management information 241.

Incidentally, if the top address of the same top address unit is searched from the different bit position 2413 of the management information 241 in a state where the management information 241 is associated with the top address of the top address unit 242, the hash management table 240 manages the management information 241 by associating it with the management information 241 associated with the top address of the top address unit 242.

Further, when the top address of the same top address unit 242 is thereafter searched from the difference bit position 2413 of the management information 241, the hash management table 240 manages the management information 241 by associating it with the management information 241 associated at the very end.

Like this, in the hash management table 240, by associating the top address of the top address unit 242 with the number of the bit position of the differential bitmap table 310, the management information 241 can be subject to hash management with the number of the bit position of the differential bitmap table 310, and, as a result, the management information 241 can be subject to efficient load balancing, and hash management can be performed with even higher retrieval performance.

Further, in the hash management table 240, by managing the small block area with the top LBA 2417 and small block area length 2418, in comparison to a case of managing the same with the bitmap table of the small block area, write data can be managed with even less memory capacity.

Figure 9:
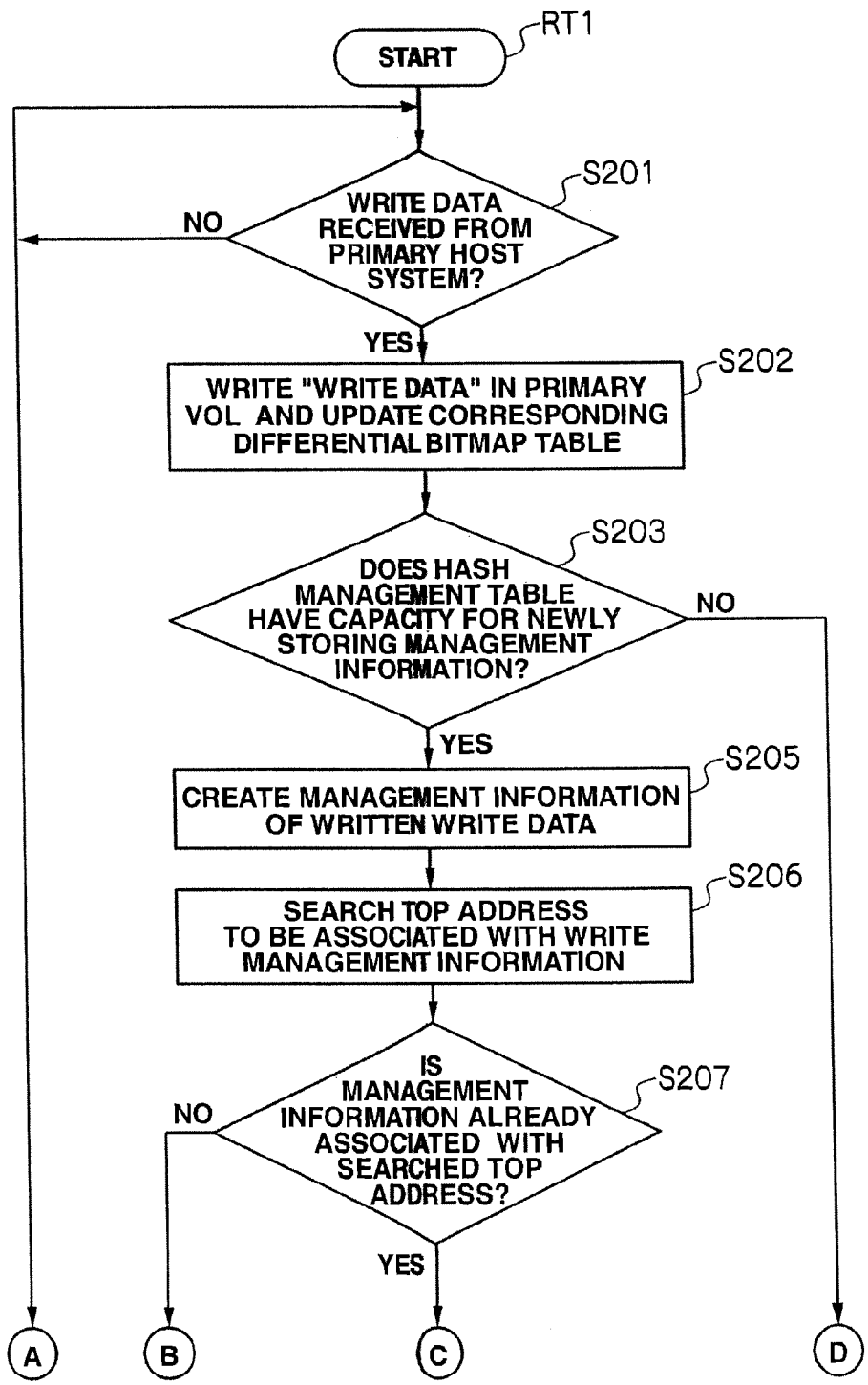
FIG. 9 is a flowchart for explaining the management processing routine of write data.
Figure 10:
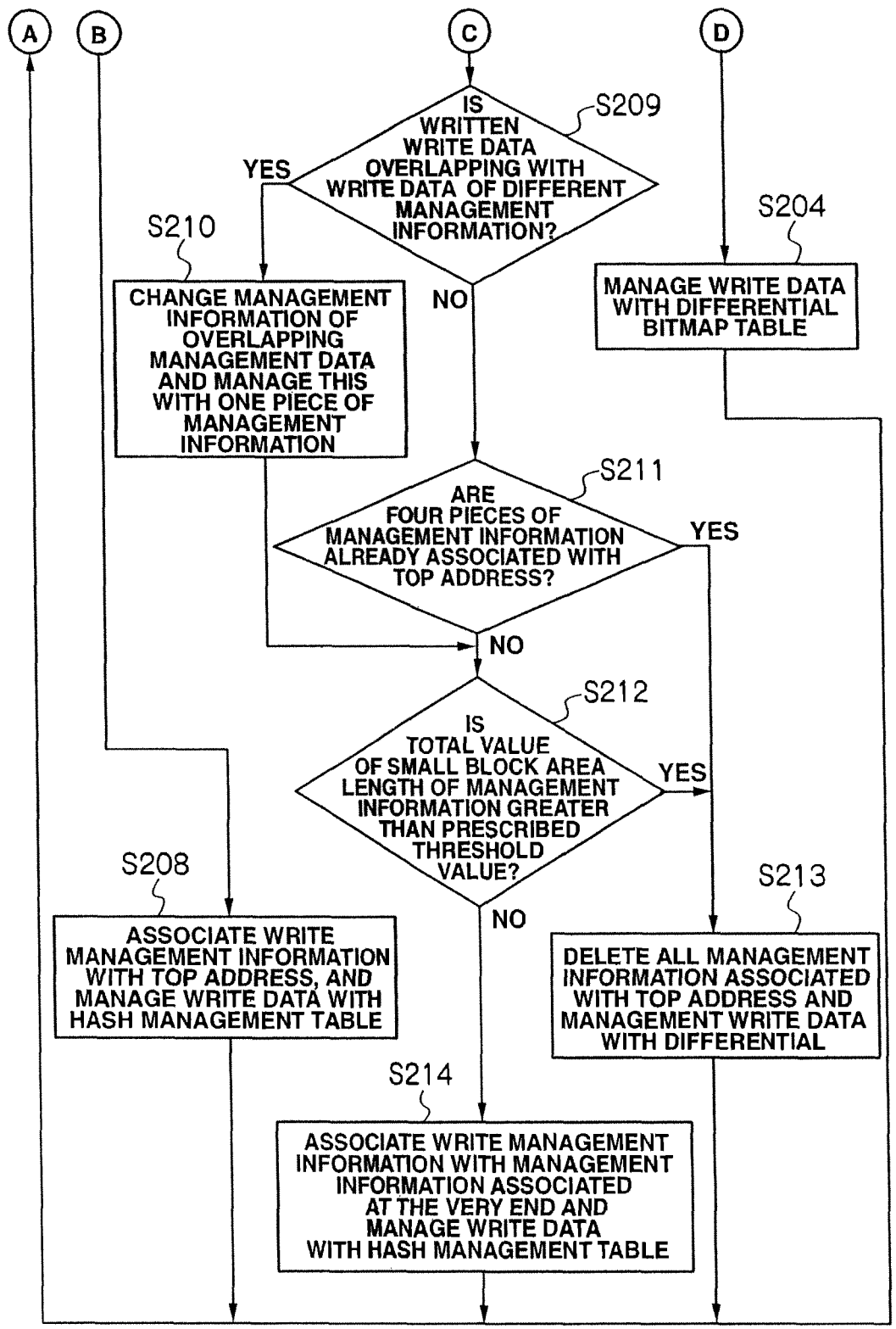
FIG. 10 is a flowchart for explaining the management processing routine of write data.

Here, FIG. 9 and FIG. 10 are flowcharts showing the specific processing routine of the first storage controller 20 pertaining to the management processing of write data using the differential bitmap table 310 and hash management table 240 in the storage system 10.

The CPU 23, initially, waits in a standby mode for receiving write data from the primary host system 100 according to the write data management processing routine RT1 shown in FIG. 9 and FIG. 10 (S201).

When the CPU 23 eventually receives the write data form the primary host system 100 (S201: YES), it writes the received write data in the primary VOL 600, and updates the bit of the differential bitmap table 310 corresponding to the block area of the written write data from "0" to "1" (S202).

Next, the CPU 23 searches the capacity of the hash management table 240, and checks whether the hash management table 240 has capacity for newly storing the management information 241 of the written write data (S203).

And, when the hash management table 240 does not have capacity for newly storing the management information 241 of the written write data (S203: NO), the CPU 23 manages the written write data with the bit of the differential bitmap 310 corresponding to the block area of the written write data (S204), and thereafter returns to the standby mode once again for waiting to receive the write data from the primary host system 100 (S201).

Meanwhile, when the hash management table 240 does have capacity for newly storing the management information 241 of the written write data (S203: YES), the CPU 23 creates management information 241 of the written write data (this is hereinafter referred to as the "write management information 241") (S205).

Figure 11:
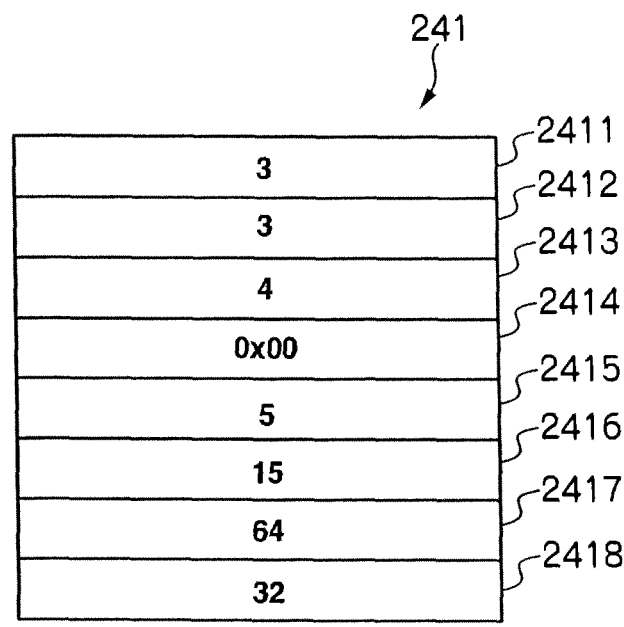
FIG. 11 is a conceptual diagram for explaining management information.

Here, for instance, as shown in FIG. 11, in the write management information 241, let it be assumed that the PLUN 2411 is "3", the P_VLUN 2412 is "3", the difference bit position 2413 is "4", the subsequent management information top LBA 2414 is "0x00", the CTG 2415 is "5", the difference management ID 2416 is "15", the top LBA 2417 is "64" (position of 32K bytes from the top), and the small block area length 2418 is "32" (16K bytes).

Incidentally, "0x00" in the subsequent management information top LBA 2414 of the write management information 241 is the lattermost management information 241 to be associated with the top address of the top address unit 242 in the hash management table 240, and shows that it is not associated with the subsequent management information 241.

Next, the CPU 23 searches the top address of the top address unit 242 to be associated with the write management information 241 from the difference bit position 2413 of the write management information 241 (S206).

Next, the CPU 23 checks whether the different management information 241 has already been associated with the top address of the top address unit 242 searched based on the difference bit position 2413 of the write management information 241 (S207).

And, when the different management information 241 has not been associated with the top address of the top address unit 242 (S207: NO), the CPU 23 associates the write management information 241 with the top address of the top address unit 242, manages the written write data with the top address 2417 of the write management information 241 and the small block area length 2418 in the hash management table 240 (S208), and thereafter returns once again to the standby mode of waiting to receive the write data from the primary host system 100 (S201).

Meanwhile, when the different management information 241 has been associated with the top address of the top address unit 242 (S207: YES), the CPU 23 researches the top LBA 2417 of the different management information 241 and the small block area length 2418, and checks whether the written write data overlaps with the write data being managed with the different management information 241 (S209).

And, when the written write data is overlapping with the write data being managed with the different management information 241 (S209: YES), the CPU 23 researches the top LBA 2417 of the associated different management information 241 and the small block area length 2418, changes the write management information 241 and different management information 241 to be compiled into a single piece of management information 241, and continues managing the written write data with the top address 2417 of the write management information 241 and the small block area length 2418 in the hash management table 240 (S210).

Figure 12:
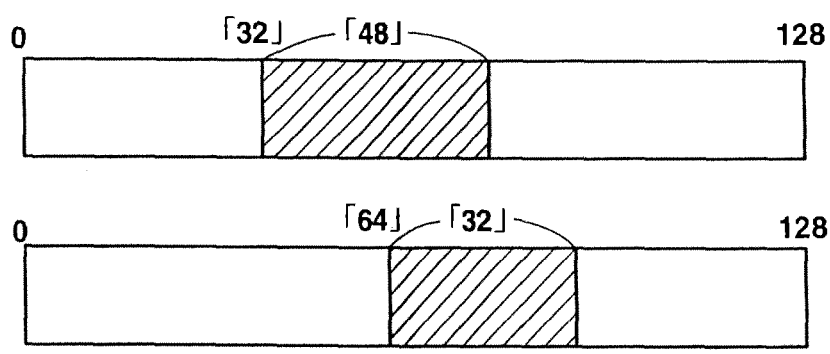
FIG. 12 is a conceptual diagram for explaining the compilation of management information.

For example, when the top LBA 2417 of the different management information 241 already associated with the top address of the top address unit 242 is "32", and the small block area length 2418 is "48", as shown in FIG. 12, this means that the written write data is overlapping with the write data being managed by the management information 241.

Figure 13:
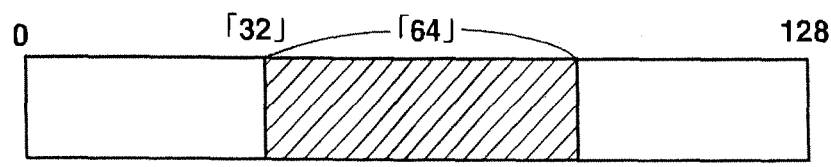
FIG. 13 is a conceptual diagram for explaining the compilation of management information.

Here, as shown in FIG. 13, by changing the small block area length 2418 of the different management information 241 already associated with the top address of the top address unit 242 from "48" to "64", the CPU 23 is able to compile the different management information 241 already associated with the top address of the top address unit 242 and the write management information 241, and manages these as a single piece of management information 241.

Like this, with the CPU 23, when the written write data is overlapping with the write data being managed by the different management information 241 in the hash management table 240, by managing the overlapping the write data with a single piece of management information 241 and not separate pieces of management information 241, write data can be managed with even less memory capacity of the hash management table 240, and, as a result, the memory capacity of the hash management table 240 can be effectively used to improve the transfer efficiency of write data.

Contrarily, when the written write data is not overlapping with the write data being managed by the different management information 241 (S209: NO), the CPU 23 researches the number of pieces of different management information 241 already associated with the top address of the top address unit 242, and checks whether four pieces of different management information 241 have already been associated with the top address of the top address unit 242 (S211).

And, when the number of pieces of different management information 241 already associated with the top address of the top address unit 242 is less than four (S211: NO), the CPU 23 researches the different management information 241 already associated with the top address of the top address unit 242, and the total value of the small block area length 2418 of the write management information 241, and checks whether this total value is greater than a prescribed threshold value (for instance, the threshold value is 48K bytes) (S212).

And, when the total value of the small block area length 2418 is greater than the threshold value (S212: YES), or when the number of pieces of different management information 241 already associated with the top address of the top address unit 242 is four or more (S211: YES), the CPU 23 deletes all management information 241 already associated with the top address of the top address unit 242, manages the written write data with the bit of the differential bitmap 310 corresponding to the block area of the written write data (S204), and thereafter returns once again to the standby mode of waiting to receive the write data from the primary host system 100 (S201).

Like this, with the CPU 23, by deleting, and not managing, all management information 241 of the write data in which the transfer efficiency will not change even if the write data is transferred to the second storage controller 50 in the block area, it is possible to manage the write data with even less memory capacity of the hash management table 240, and, as a result, it is possible to improve the transfer efficiency of write data by effectively using the memory capacity of the hash management table 240.

Contrarily, when the total value of the small block area length 2418 is less than the threshold value (S212: NO), the CPU 23 associates the write management information 241 with the lattermost management information 241 associated with the top address of the top address unit 242, and manages the written write data with the top address 2417 of the write management information 241 and the small block area length 2418 in the hash management table 240 (S214).

Here, for example, by changing the subsequent management information top LBA 2414 of the lattermost management information 241 associated with the top address of the top address unit 242 from "0x00" to "16" as the top LBA 2417 of the write management information 241, the CPU 23 is able to associate the write management information 241 with the lattermost management information 241 associated with the top address of the top address unit 242.

And, the CPU 23 thereafter returns once again to the standby mode of waiting to receive the write data from the primary host system 100 (S201).

(2-2) Transfer Processing of Write Data Using Differential Bitmap Table 310 and Hash Management Table 240 in Present Embodiment Next, the transfer processing of write data using the differential bitmap table 310 and hash management table 240 in the storage system 10 according to the present embodiment is explained. The storage system 10 of the present embodiment is characterized in that it transfer the write data to the second storage controller 50 with a block area (first data management unit) or an area that is smaller in comparison to such block area (second data management unit).

Figure 14:
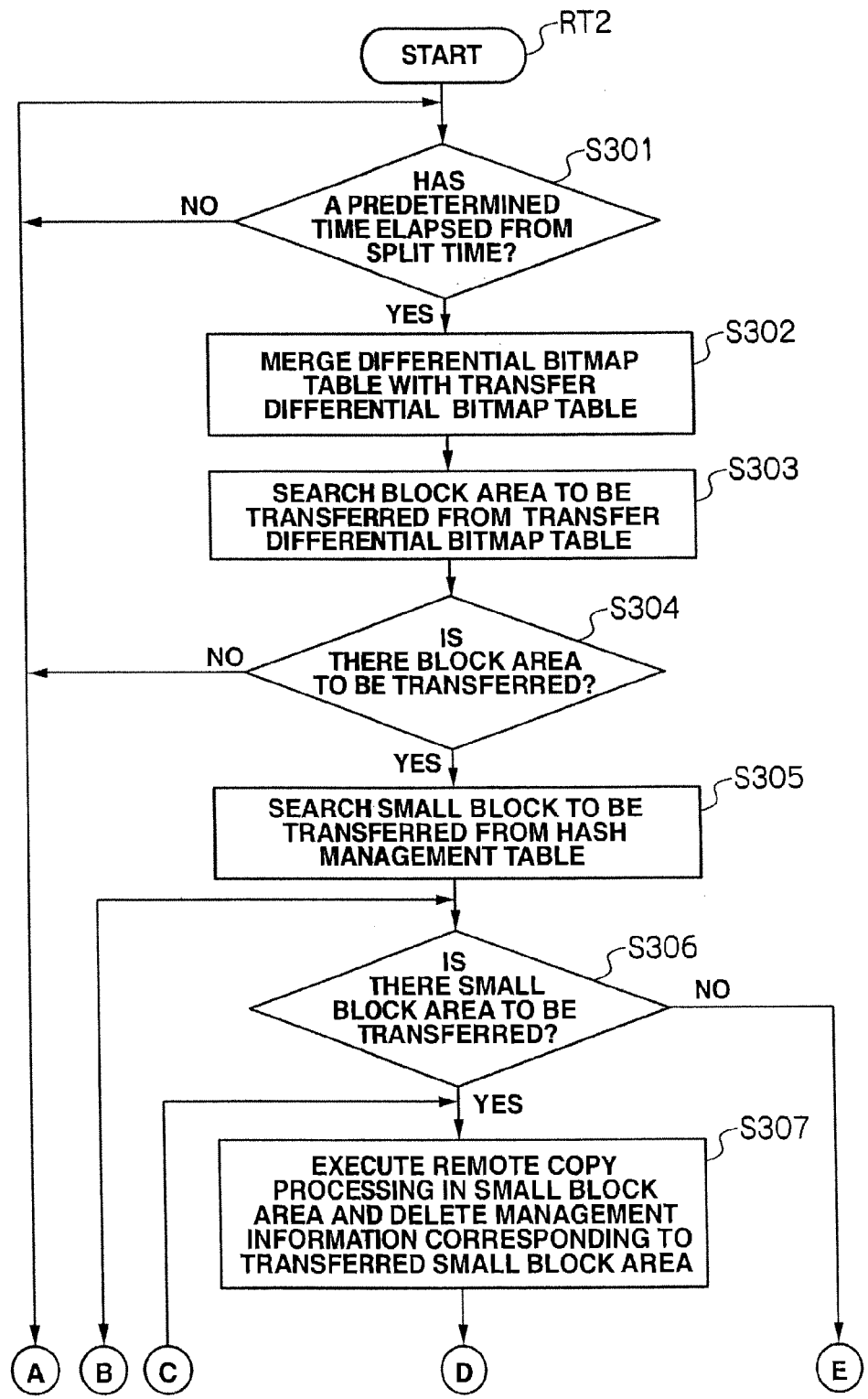
FIG. 14 is a flowchart for explaining the transfer processing routine of write data.
Figure 15:
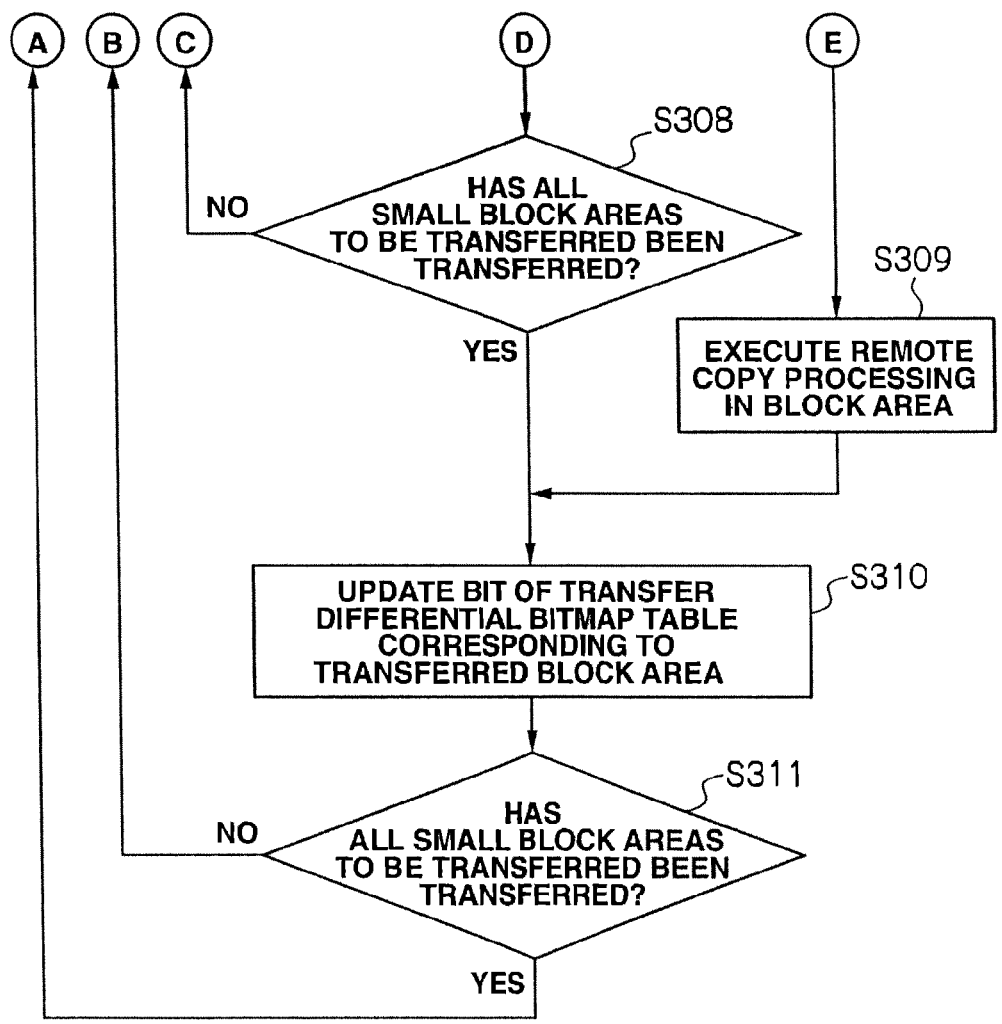
FIG. 15 is a flowchart for explaining the transfer processing routine of write data.

Here, FIG. 14 and FIG. 15 are flowcharts showing the specific processing routine of the first storage controller 20 and second storage controller 50 relating to the transfer processing of write data using the differential bitmap table 310 and hash management table 240 in the storage system 10.

The CPU 23, initially, waits in a standby mode for a predetermined time to lapse from the split point according to the write data transfer processing routine RT2 shown in FIG. 14 (S301).

When a predetermined time eventually elapses from the split point (S301: YES), the CPU 23 operates the remote copying execution program 210 and merges the differential bitmap table 310 to the transfer differential bitmap table 510 (S302).

Next, the CPU 23 searches for the block are to be transferred corresponding to the bit updated to "1" by searching a bit in which the bit of the transfer differential bitmap table 510 has been updated to "1" (S303).

Next, the CPU 23 checks, as the search result upon searching for a bit of the transfer differential bitmap table 510 that has been updated to "1", whether there is a block area to be transferred corresponding to the bit updated to "1" (S304).

And, when there is no block area to be transferred corresponding to the bit updated to "1" (S304: NO), the CPU 23 thereafter returns once again to the standby mode of waiting for a predetermined time to lapse from the split point (S301).

Contrarily, when there is a block area to be transferred corresponding to the bit updated to "1" (S304: YES), the CPU 23 searches for a block to be transferred in the block area to be transferred corresponding to a bit updated to "1" by searching the management information 241 associated with the top address of the top address unit of the hash management table 240 in which the bit of the transfer differential bitmap table 510 has been updated to "1" (S305).

Next, the CPU 23 checks whether there is a small block area to be transferred in the block area to be transferred as the search result of searching the management information 241 associated with the top address of the top address unit of the hash management table 240 in which the bit of the transfer differential bitmap table 510 has been updated to "1" (S306).

And, when there is a small block area to be transferred in the block area to be transferred (S306: YES), the CPU 23 executes the foregoing remote copy processing in the small block area to be transferred in the block area to be transferred and transfers the small block area to be transferred in the block area to be transferred, and thereafter deletes the management information 241 corresponding to the transferred small block area (S307).

Here, for instance, by changing the subsequent management information top LBA 2414 associated with the one before the deleted management information 241 to the subsequent management information top LBA 2414 associated with the one after the deleted management information 241, the CPU 23 is able to associate the management information 241 associated with the one after the deleted management information 241 with the management information 241 associated with the one before the deleted management information 241.

Next, by searching the management information 241 associated with the top address of the top address unit of the hash management table 240 corresponding to the bit position in which the bit of the transfer differential bitmap table 510 has been updated to "1", the CPU 23 checks whether all small block areas to be transferred in the block area to be transferred have been transferred (S308).

And, when all small block areas to be transferred in the block area to be transferred have not been transferred (S308: NO), the CPU 23 executes the foregoing remote copy processing in the small block area to be transferred in the block area to be transferred and transfers the small block area to be transferred in the block area to be transferred, and thereafter deletes the management information 241 corresponding to the transferred small block area (S307).

Meanwhile, when there is no small block area to be transferred in the block area to be transferred (S306: NO), the CPU 23 executes the foregoing remote copy processing in the block area to be transferred (S309).

And, when all small block areas to be transferred in the block area to be transferred have been transferred (S308: YES), or when the foregoing remote copy processing has been executed in the block area to be transferred, the CPU 23 updates the bit of the transfer differential bitmap table 510 corresponding to the transferred block area from "1" to "0" (S310).

Next, the CPU 23 checks whether all block areas to be transferred have been transferred by searching the block area to be transferred in the block area to be transferred corresponding to a bit that has been updated to "1" (S311).

And, when all block areas to be transferred have not been transferred (S311: NO), the CPU 23 checks whether there is a small block area to be transferred in the block area to be transferred (S306).

Contrarily, when all block areas to be transferred have been transferred (S311: YES), the CPU 23 thereafter returns once again to the standby mode of waiting for a predetermined time to elapse from the split point (S301).

Thereafter, the CPU 63 performs the foregoing remote copy processing so as to reproduce the data image of the primary VOL 600 at the split point in the secondary VOL 700, and reports the write completion to the CPU 23.

Further, upon writing the data received from the CPU in the secondary VOL 700, the CPU 63 migrates the unupdated data (data before being updated (overwritten) with the write data and which is past data that was written in the secondary VOL 700) from the secondary VOL 700 to the pool VOL 720.

And, the CPU 63 updates the snapshot management information 400 to information for restoring the data image of the secondary VOL 700 at the split point from the data stored in the second VOL 700 at the split point and the data migrated from the secondary VOL 700 to the pool VOL 720 after the split point.

Incidentally, with the first storage controller 20, since the virtual VOL 610, snapshot management information 300, and transfer differential bitmap table 510 are dual written in the cache memories 25A, 25B, the hash management table 240 is not written dually since it is stored in the local memory 26.

Therefore, with the first storage controller 20, when a failure occurs to one of the controllers during remote copy processing, the CPU of the other controller will continue to execute such remote copy processing. Here, the CPU of the other controller is able to execute the foregoing remote copy processing in the transferred block area by referring only to the transfer differential bitmap table 310, and without having to refer to the hash management table 240.

Further, with the first storage controller 20, when a failure occurs to one of the controllers during remote copy processing and the CPU of the other controller newly receives write data from the primary host system 100, and the management information 241 is stored in the hash management table 240, all management information 241 is deleted, and, from such point in time onward, the CPU of the other controller is able to execute the management processing and transfer processing using the differential bitmap table 310 and hash management table 240.

Meanwhile, with the first storage controller 20, when the failure of one of the controllers is recovered thereafter, in order to prevent discrepancies from the occurrence of a failure to the recovery thereof, the foregoing remote copy processing is executed in the transferred block area by the CPU of one controller referring only to the transfer differential bitmap table 310 without referring to the hash management table 240.

Further, with the first storage controller 20, in a case where the failure of one of the controllers is recovered, and the CPU of the pertinent controller newly receives write data from the primary host system 100, and the management information 241 is stored in the hash management table 240, all management information 241 is deleted, and, from such point in time onward, the CPU of the one controller is able to execute the management processing and transfer processing using the differential bitmap table 310 and hash management table 240.

Like this, the storage system 10 is able to manage write data of the block area with the bit of the differential bitmap table 310, and manage write data of an area that is smaller in comparison to the block area with the management information 241 of the hash management table 240.

Therefore, with the storage system 10, when the write data to be transferred to the second storage controller 50 in the block area is small, the traffic of write data can be reduced by executing remote copy processing in the small block area, and, when the write data to be transferred to the second storage controller 50 in the block area is large, the memory capacity of the hash management table 240 can be reduced by executing the remote copy processing in the block area. As a result, in addition to effectively preventing the increase in memory capacity, it is also possible to dramatically improve the transfer efficiency of data.

Incidentally, in the present embodiment, although a case was explained where write data is managed with the block area (first data management unit) and an area that is smaller in comparison to such block area (second data management unit), the present invention is not limited thereto, and, for instance, write data may be managed with three or more data management units.

Further, in the present embodiment, although a case was explained where one block area is "64K bytes", and the minimum unit of one small block area is "512 bytes", the present invention is not limited thereto, and, for instance, one block area may be "64K bytes", and the minimum unit of one small block area may be "8K bytes", and block areas and small block areas in various other sizes can be managed.

Moreover, in the present embodiment, although a case was explained where all management information 241 already associated with the top address of the top address unit 242 is deleted, and the threshold value for managing the written write data with the bit of the differential bitmap 310 corresponding to the block area of the written write data is set to "48K bytes", the present invention is not limited thereto, and, for example, the threshold value may also be set to "32K bytes", and a threshold value in various other sizes can be used.

Further, in the present embodiment, although a case was explained where all management information 241 already associated with the top address of the top address unit 242 is deleted when there are four pieces of different management information 241 already associated with the top address of the top address unit 242, and managing the written write data with the bit of the differential bitmap 310 corresponding to the block area of the written write data, the present invention is not limited thereto, and, for instance, the number of pieces of different management information 241 may be four or more, or a number greater than four, and various other numbers may be used.

(3) Priority Execution Processing of Command Job in Present Embodiment

Next, the priority execution processing of a command job in the storage system 10 according to the present embodiment is explained. The storage system 10 of the present embodiment is characterized in that it sets the priority of command jobs, arranges and stores the command jobs according to such priority, and executes the command jobs in the arranged order according to the setting based on priority.

Figure 16:
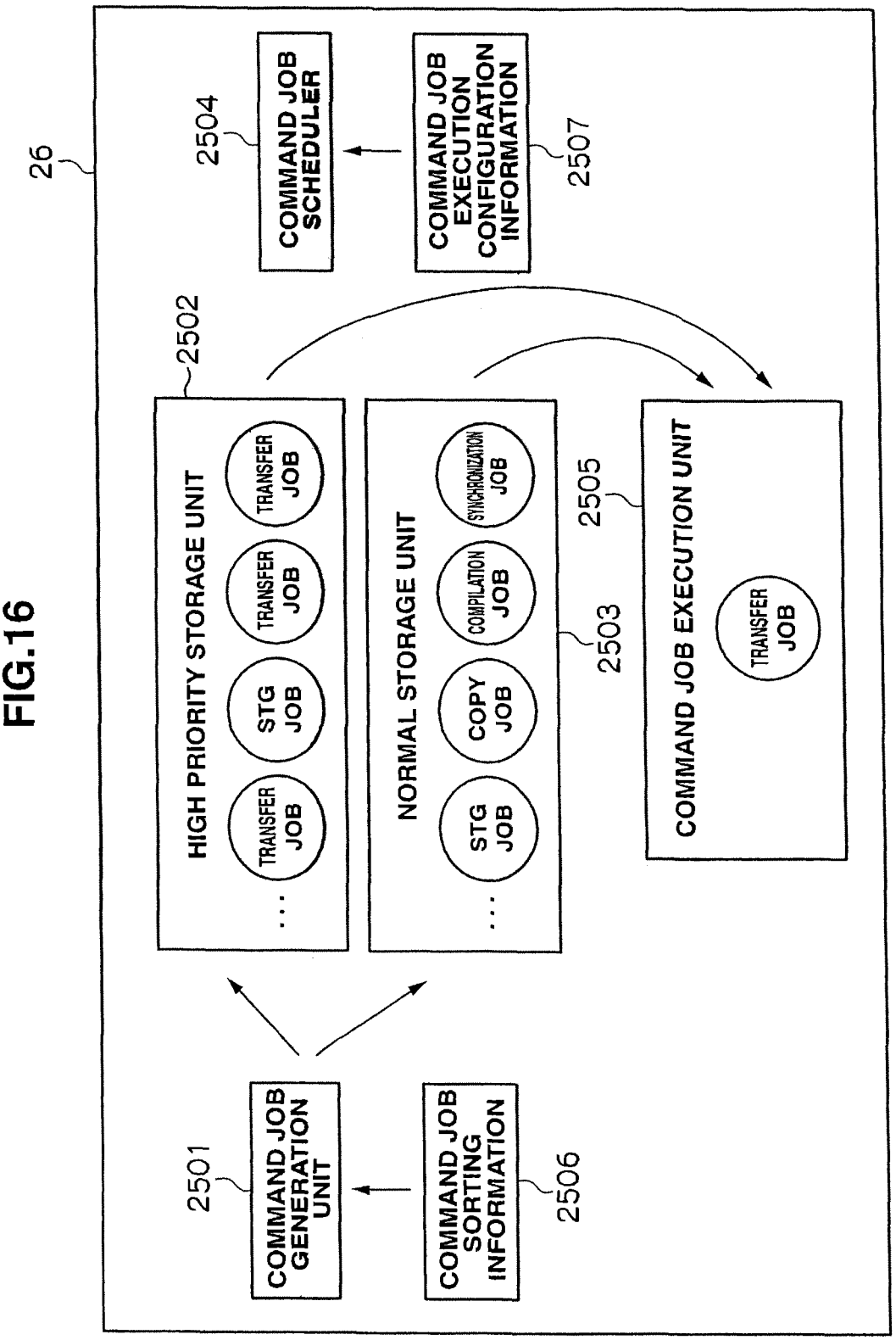
FIG. 16 is a conceptual diagram for explaining the priority execution processing of a command job.

FIG. 16 shows a schematic diagram of the command job priority execution processing to be performed based on the execution of the command job priority execution program 250 by the CPU 23. The CPU 23, by executing the command job priority execution program 250, expands a job generation unit 2501, a high priority storage unit 2502, a normal storage unit 2503, a command job scheduler 2504, a command job execution unit 2505, command job sorting information 2506, and command job execution configuration information 2507 in a local memory 26.

Figure 17:
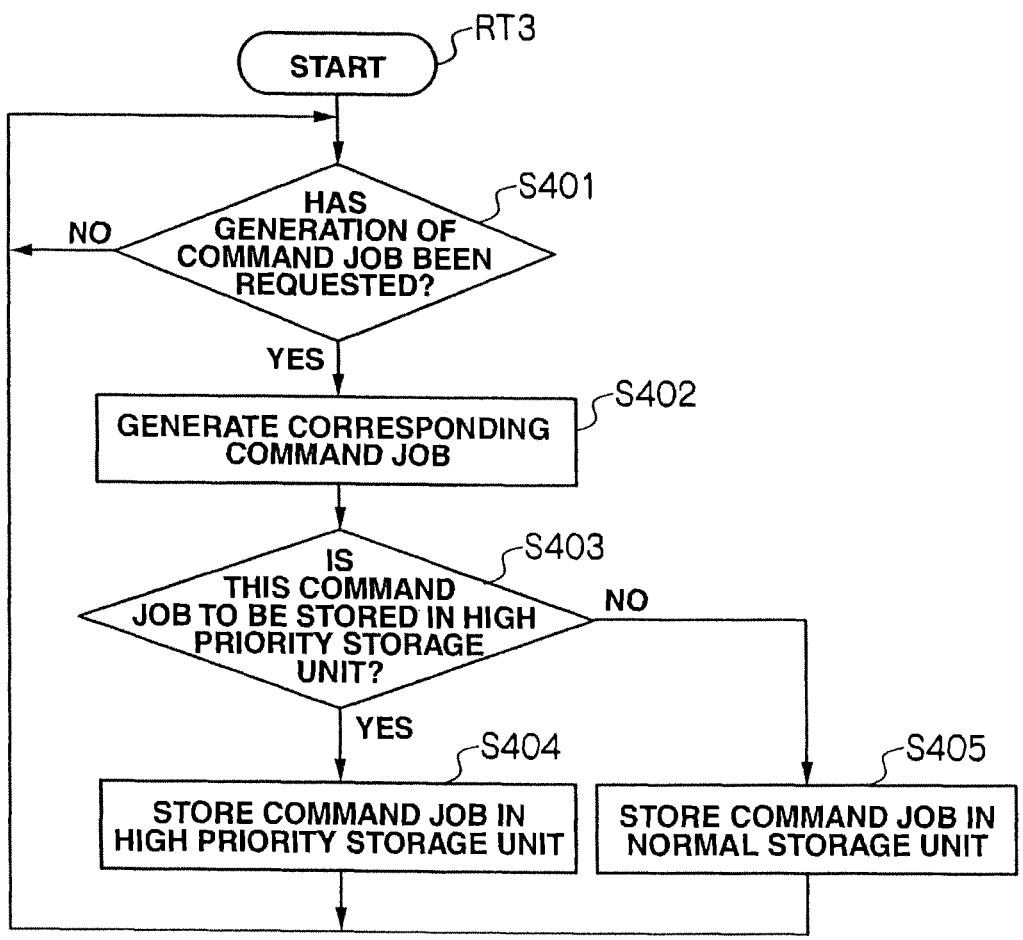
FIG. 17 is a flowchart for explaining the storage processing routine of a command job.

Here, FIG. 17 is a flowchart showing the specific processing routine of the first storage controller 20 relating to the storage processing of command jobs in the storage system 10.

The CPU 23, initially, based on the read command or write command, execution request of remote copy processing, execution request of internal copy processing and so on from the primary host system 100, checks whether a generation request of a command job as a job for the CPU 23 to execute these operations has been received by the job command generation unit 2501 according to the command job storage processing routine RT3 shown in FIG. 17 (S401).

And, when the generation request of a command job has not been received by the job command generation unit 2501 (S401: NO), the CPU 23 waits in a standby mode for the generation request of a command job to be received by the job command generation unit 2501.

Meanwhile, when the generation request of a command job has been received by the job command generation unit 2501 (S401: YES), the CPU 23 generates a command job corresponding to the foregoing access or request in the job command generation unit 2501 (S402).

Next, the CPU 23 checks whether the generated command job is to be stored in the high priority storage unit 2502 by referring to the command job sorting information 2506 in the job command generation unit 2501 (S403).

Here, the high priority storage unit 2502 stores command jobs having a "high" priority among the command jobs, and stores such command jobs in order from the oldest to newest.

Further, the normal storage unit 2503 stores command jobs having a "medium" priority among the command jobs, and stores such command jobs in order from the oldest to newest.

Specifically, the high priority storage unit 2502 and normal storage unit 2503 are systems having a function like a FIFO (First In First Out) buffer where the stored command jobs are extracted in order from the oldest to newest, and the command job stored most recently is extracted last.

Further, the command job sorting information 2506 sets the priority of command jobs, and is information representing which command jobs among the command jobs are to be sorted and stored in the high priority storage unit 2502, and which command jobs are to sorted and stored in the normal storage unit 2503.

Specifically, the command job sorting information 2506, for instance, is made to realize that the "data transfer job (transfer job)" for performing remote copy processing and the "staging job (STG job)" of the data transfer job among the command jobs are command jobs of "high" priority, and other command jobs are command jobs of "medium" priority.

And, when the CPU 23 is to store the generated command job in the high priority storage unit 2502 upon referring to the command job sorting information 2506 in the job command generation unit 2501 (S403: YES), the CPU 23 stores the generated command job in the high priority storage unit 2502 by placing it at the very end of the command jobs that are already arranged in the high priority storage unit 2502 from the oldest to newest (S404).

Meanwhile, when the CPU 23 is to store the generated command job in the normal storage unit 2503 upon referring to the command job sorting information 2506 in the job command generation unit 2501 (S403: NO), the CPU 23 stores the generated command job in the normal storage unit 2503 by placing it at the very end of the command jobs that are already arranged in the normal storage unit 2503 from the oldest to newest (S405).

For instance, when the generated command job is a "data transfer job", the CPU 23 stores the "data transfer job" in the high priority storage unit 2502 by placing it at the very end of the command jobs that are already arranged in the high priority storage unit 2502 from the oldest to newest, and, when the generated command job is a "compilation job", the CPU 23 stores the "compilation job" in the normal storage unit 2503 by placing it at the very end of the command jobs that are already arranged in the normal storage unit 2503 from the oldest to newest.

Eventually, the CPU 23 thereafter checks once again whether the generation request of a command job has been received by the job command generation unit 2501 (S401).

Figure 18:
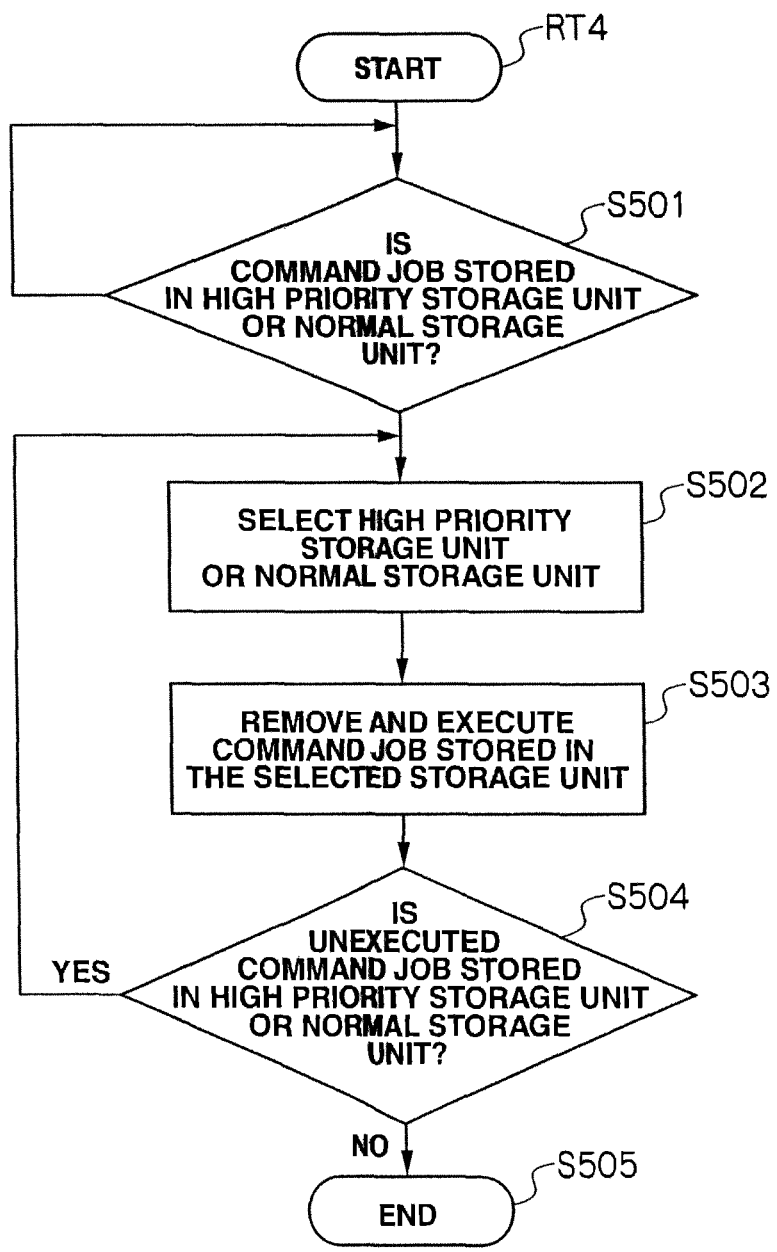
FIG. 18 is a flowchart for explaining the priority execution processing routine of a command job.

Further, FIG. 18 is a flowchart showing the specific processing of the first storage controller 20 relating to the priority execution processing of command jobs in the storage system 10.

The CPU 23, initially, checks whether a command job is stored in the high priority storage unit 2502 or normal storage unit 2503 in the command job scheduler 2504 according to the command job priority execution processing routine RT4 shown in FIG. 18 (S501).

And, when a command job is not stored in the high priority storage unit 2502 or normal storage unit 2503 (S501: NO), the CPU 23 waits in a standby mode for a command job to be stored in the high priority storage unit 2502 or normal storage unit 2503.

Meanwhile, when a command job is stored in the high priority storage unit 2502 or normal storage unit 2503 (S501: YES), the CPU 23 selects to extract the command job from either the high priority storage unit 2502 or normal storage unit 2503 by referring to the command job execution configuration information 2507 in the command job scheduler 2504, and sends the oldest stored command job to the command job execution unit 2505 (S502).

Here, the command job scheduler 2504 selects to extract the command job from either the high priority storage unit 2502 or normal storage unit 2503, and sends the oldest command job stored in the selected storage unit to the command job execution unit 2505.

Further, each time the execution of a command job with the command job execution unit 2505 is ended, the command job scheduler 2504 similarly selected either the high priority storage unit 2502 or normal storage unit 2503 as described above, and sends the command job to the command job execution unit 2505.

The command job execution configuration information 2507 is information representing whether the command job stored in the high priority storage unit 2502 is to be extracted and sent to the command job execution unit 2505, or the command job stored in the normal storage unit 2503 is to be extracted and sent to the command job execution unit 2505.

Specifically, the command job execution configuration information 2507, for instance, is made to execute, at "2:1", the process of extracting the command job stored in the high priority storage unit 2502 and sending it to the command job execution unit 2505, and the processing of extracting the command job from the normal storage unit 2503 and sending it to the command job execution unit 2505.

In other words, when the CPU 23 sends the two oldest command jobs stored in the high priority storage unit 2502 in the command job scheduler 2504, the CPU 23 then sends one oldest command job stored in the normal storage unit 2503.

Next, the CPU 23 executes the command job sent from the command job scheduler 2504 in the command job execution unit 2505 (S503).

Next, the CPU 23 checks whether an unexecuted command job is still stored in the high priority storage unit 2502 or normal storage unit 2503 in the command job scheduler 2504 (S504).

And, when an unexecuted command job is still stored in the high priority storage unit 2502 or normal storage unit 2503 (S504: YES), the CPU 23 thereafter once again selects a command job from the high priority storage unit 2502 or normal storage unit 2503 by referring to the command job execution configuration information 2507 in the command job scheduler 2504, and sends this to the command job execution unit 2505 (S502).

Meanwhile, when an unexecuted command job is not stored in the high priority storage unit 2502 or normal storage unit 2503 (S504: NO), the CPU 23 thereafter ends this command job priority execution processing routine RT4 (S505).

Incidentally, when a command job is not stored in the high priority storage unit 2502 in the command job scheduler 2504, the CPU 23 extracts the command job of the normal storage unit 2503 and sends it to the command job execution unit 2505 until a command job is newly stored in the high priority storage unit 2502, and, when a command job is not stored in the normal storage unit 2503, the CPU 23 extracts a command job of the high priority storage unit 2502 and sends it to the command job execution unit 2505 until a command job is newly stored in the normal storage unit 2503.

And, when a command job is stored in the high priority storage unit 2502 and normal storage unit 2503, the CPU 23 refers to the command job execution configuration information 2507 in the command job scheduler 2504.

Like this, with the storage system 10, by providing a high priority storage unit 2502, setting the priority of command jobs, storing command jobs having "high" priority in the high priority storage unit 2502, and preferentially executing the "high" priority command job according to the command job execution configuration information 2507, even when the CPU 23 is in an overloaded state, it is possible to effectively prevent a situation where a command job that must be preferentially executed for maintaining the processing performance of the first storage controller 20 not being executed, and, as a result, the processing performance of the first storage controller 20 can be maintained a balanced manner.

Further, with the storage system 10, by storing the "data transfer job" and its "staging job" in the high priority storage unit 2502, and preferentially executing the "data transfer job" and its "staging job" according to the command job execution configuration information 2507, even when the CPU 23 is in an overloaded state, the access processing performance from the primary host system 100 and the data transfer performance to the second storage controller 50 can be maintained in a balanced manner.

Incidentally, in the present embodiment, although a case was explained where the command job sorting information 2506 was set such that the "data transfer job (transfer job)" and the "staging job (STG job)" of the data transfer job are made to be "high" priority command jobs, and the other command jobs are made to be "medium" priority command jobs, the present invention is not limited thereto, and, for instance, the "copy job" may be made to be a "high" priority command job, and the priority of various command jobs can be set or changed freely.

Further, in the present embodiment, although a case was explained where the two command jobs; namely, a "high" priority command job and a "medium" priority command job are sorted to corresponding storage units based on the command job sorting information 2506, the present invention is not limited thereto, and three command jobs; namely, a "high" priority command job, "medium" priority command job, and "low" priority command job may be sorted to corresponding storage units. In addition, after the preferential sorting, the number of corresponding storage units may be set to three or more, and the foregoing jobs may be respectively sorted to the corresponding storage units.

Moreover, in the present embodiment, although a case was explained of referring to the command job execution configuration information 2507 so as to execute, at "2:1", the process of extracting the command job stored in the high priority storage unit 2502 and sending it to the command job execution unit 2505, and the processing of extracting the command job from the normal storage unit 2503 and sending it to the command job execution unit 2505, the present invention is not limited thereto, and, for instance, the execution may be made in a ratio other than "2:1" such as "3:1" or "5:2", or various other methods other than the foregoing ratio may be used for selecting whether to extract the command job from the high priority storage unit 2502 or normal storage unit 2503.

Like this, with the storage system 10, by freely setting and changing the command job sorting information 2506 and command job execution configuration information 2507, the processing performance of the first storage controller 20 can be maintained in an even more balanced manner.

(4) Transmission/Reception Processing of Compilation Communication Command in Present Embodiment Next, the transmission/reception processing of the compiled communication command in the storage system 10 according to the present embodiment is explained. The storage system 10 of the present embodiment is characterized in that it compiles the same types of command commands in the storage controller of the communication source into a single compiled communication command, transmits this to the storage controller of the communication destination, divides the compiled communication command into individual communication commands in the storage controller of the communication destination, executes processing to the individual communication commands, transmits the processing result of the compiled communication command to the storage controller of the communication source, and executes processing to the transmitted processing result in the storage controller of the communication source.

Figure 19:
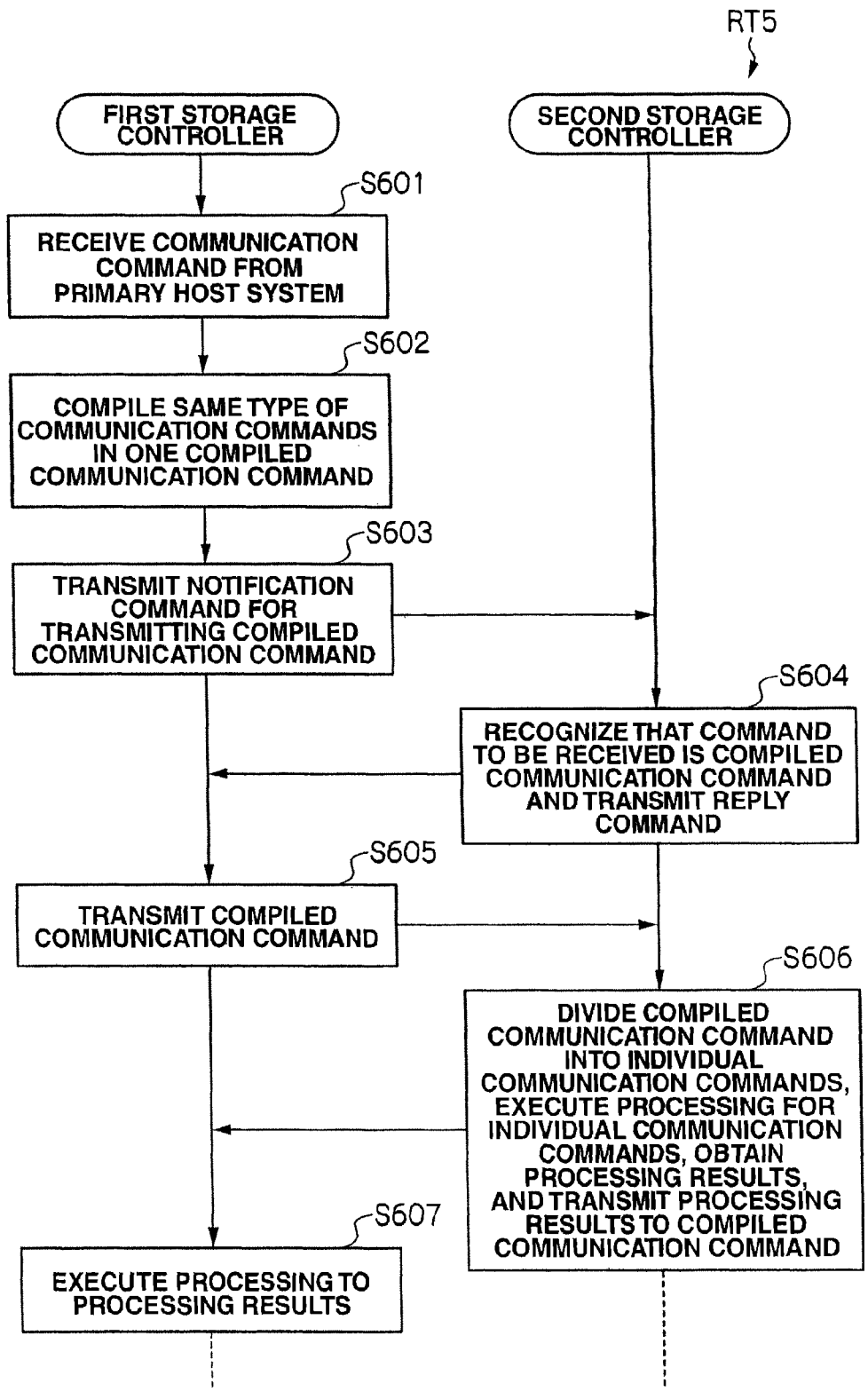
FIG. 19 is a flowchart for explaining the transmission/reception processing routine of a compiled communication command.

Here, FIG. 19 is a flowchart showing the specific processing routine of the first storage controller 20 and second storage controller 50 relating to the transmission/reception processing of the compiled communication command to be performed by the CPU 23 and CPU 63 executing the collective communication execution program 260.

The CPU 23, initially, receives a plurality of communication commands relating to the communication control with the second storage controller 50 from the primary host system 100 according to the compiled communication command transmission/reception processing RT5 shown in FIG. 19 (S601).

Figure 20:
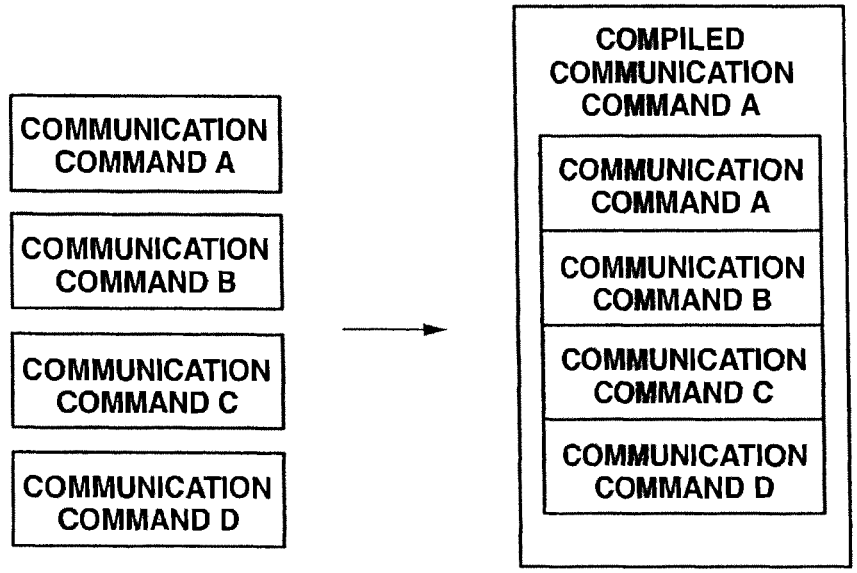
FIG. 20 is a conceptual diagram for explaining the communication command compilation processing.

Next, when the communication command A, communication command B, communication command C, and communication command D are the same type of communication commands among the plurality of communication commands, as shown in FIG. 20, the CPU 23 compile the same type of communication commands A to D into a single compiled communication command M by arranging the respective communication command A, communication command B, communication command C, and communication command D into a list (S602).

Here, for example, the communication commands A to D are the four split commands for making all four secondary VOLs 700 in a pair status with the primary VOL 600 into a split status.

Next, the CPU 23 generates a notification command for transmitting the compiled communication command M, and transmits this notification command to the second storage controller 50 (S603).

Next, when the CPU 63 receives the notification command from the first storage controller 20, it recognizes that the communication command to be received subsequently is a compiled communication command, generates a reply command recognizing that the communication command to be subsequently received is a compiled communication command, and transmits this reply command to the second storage controller 50 (S604).

Next, when the CPU 23 receives the reply command from the second storage controller 50, it transmits the compiled communication command M to the second storage controller 50 (S605).

Next, when the CPU 63 receives the compiled communication command M from the first storage controller 20, it divides the compiled communication command M into individual communication commands A to D, executes processing to each of these communication commands A to D, obtains the processing result of each processing, and transmits the processing result of the compiled communication command M (S606).

Figure 21:
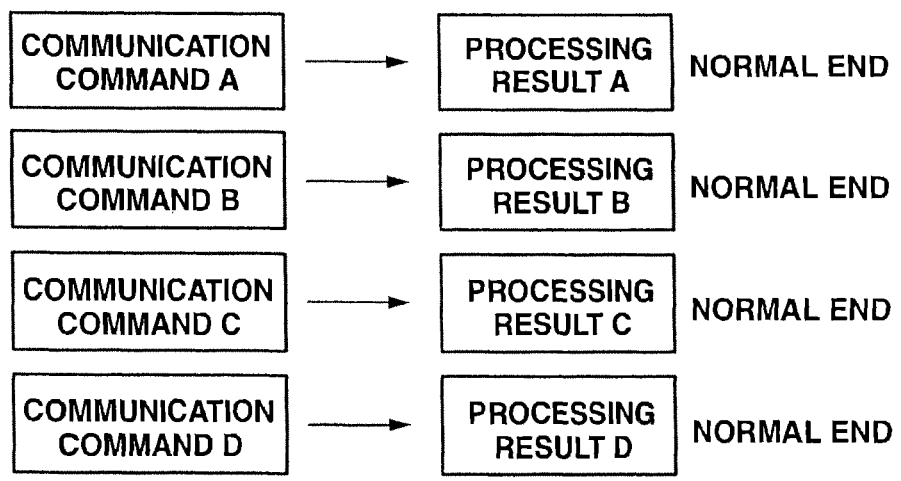
FIG. 21 is a conceptual diagram for explaining the communication command compilation processing.

Here, as shown in FIG. 21, for example, when the processing results A to D of each processing all end in a normal end, as the processing result of the compiled communication command M, the CPU 63 transmits to the second storage controller 50 the "normally ended" processing result D, which is the processing result of the communication command D as the last communication command in the compiled communication command M.

Figure 22:
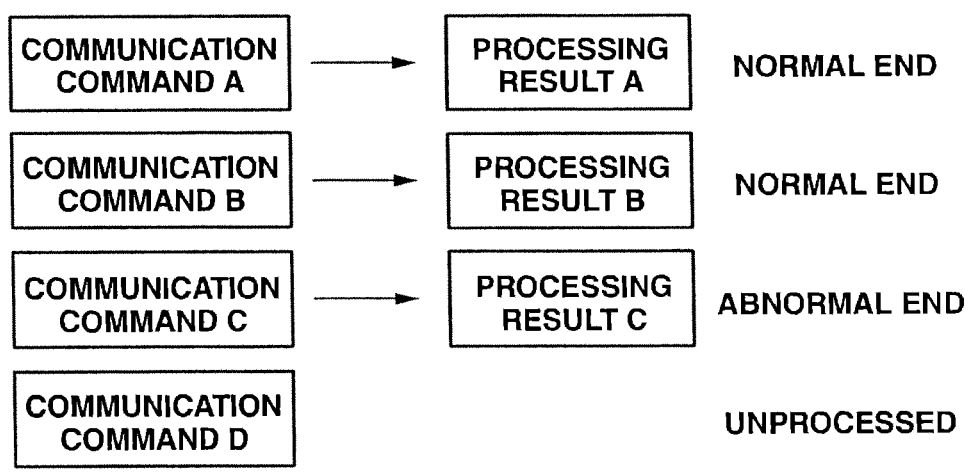
FIG. 22 is a conceptual diagram for explaining the communication command compilation processing.

Further, as shown in FIG. 22, for example, when the processing result C as the processing result of the communication command C ends abnormally, the CPU 63 abandons the processing of the unexecuted communication command D, and transmits to the second storage controller 50 the "abnormally ended" processing result C as the processing result of the compiled communication command M.

Next, when the CPU 63 receives the processing result of the compiled communication command M from the second storage controller 50, it executes the processing to the received processing result (S607).

Here, for instance, when all processing results A to D of each processing end normally and the CPU 63 receives the "normally ended" processing result D as the processing result of the compiled communication command M, it confirms the last communication command in the compiled communication command M, and, since this communication command is the communication command D, determines that the compiled communication command M ended normally, and, for example, executes the transmission/reception processing of the subsequent compiled communication command.

Further, for instance, when the processing result C as the processing result of the communication command C abnormally ended and the CPU 63 receives the "abnormally ended" processing result C as the processing result of the compiled communication command M, it confirms the last communication command in the compiled communication command M, and, since this communication command is the communication command D, it determines that the compiled communication command M abnormally ended at the communication command C, and, for example, executes the transmission/reception processing of the compiled communication command once again regarding the communication command C and communication command D.

Like this, with the storage system 10, by the first storage controller 20 compiling the same type of communication commands A to D into a single compiled communication command M and transmitting this to the second storage controller 50, the second storage controller 50 dividing the compiled communication command M into individual communication commands A to D, executing the processing to the individual communication commands A to D, transmitting the processing result of the compiled communication command M to the first storage controller 20, and the first storage controller 20 executing the processing to the transmitted processing result, it is possible to effectively prevent the deterioration in the data transfer performance caused by communicating the same type of communication command each and every time, and it is possible to improve the data transfer performance as a result thereof.

Further, for example, when the processing result C as the processing result of the communication command C abnormally ends, by abandoning the processing of the unexecuted communication command D and transmitting to the second storage controller 50 the "abnormally ended" processing result C as the processing result of the compiled communication command M, it is possible to instantaneously report the occurrence of a failure at the point in time such failure occurs, execute processing corresponding to such failure, and the processing performance of the storage system 10 can be improved as a result thereof.

Incidentally, in the present embodiment, although a case was explained where the four split commands for making all four secondary VOLs 700 in a pair status with the primary VOL 600 to be a split status as the communication commands A to D, the present invention is not limited thereto, and, for example, four pair status confirmation commands for confirming the pair status of the four secondary VOLs 700 in a pair status with the primary VOL 600, four update copy communication commands at the time of update copying from the primary VOL 600 to the secondary VOL 700 in predetermined intervals, or four update copy communication commands in which the copy processing was not completed at the time of update copying from the primary VOL 600 to the secondary VOL 700 in predetermined intervals may also be used, and various other similar communication commands may also be employed.

Further, in the present embodiment, although a case was explained where the communication command A, communication command B, communication command C, and communication command D among the plurality of communication commands are the same type of communication commands, the present invention is not limited thereto, and, for instance, so as long as these are the same type of communication commands, four or less communication commands may be compiled into a single compiled communication command, or four or more communication commands may also be compiled into a single compiled communication command.

In addition to a storage system for managing data among disk array devices, the present invention may also be applied to various other apparatuses used in the management of data transfer.

What is claimed is:

1. A storage controller comprising:
 a processor configured to:
  manage a primary volume, a virtual volume and a snapshot of the primary volume at a certain timing, the primary volume storing data sent from a host system and being paired with a secondary volume in another storage controller, the virtual volume storing differential data of the snapshot to be sent to the another storage controller;
  manage the differential data, including a first type data and a second type data in a plurality of data of the snapshot based on an amount of each type of the differential data, the second type data having a size smaller than a size of the first type data; and
  control to send the plurality of data of the snapshot to the another storage controller so that the another storage controller stores the plurality of data of the snapshot in the secondary volume.

2. The storage controller according to claim 1, wherein:
 the processor is configured to manage the first type data and the second type data for a block of a plurality of blocks, each of the plurality of blocks has a certain length and is managed by the processor for storing the plurality of data of the snapshot in the primary volume and/or the virtual volume.

3. The storage controller according to claim 2, wherein:
 the processor is configured to control to send the first type data or the second type data for the block of the plurality of blocks for sending the plurality of data of the snapshot to the another storage controller.

4. The storage controller according to claim 1, wherein:
 the processor is configured to control to acquire the snapshot periodically, to manage the first type data and the second type data in the plurality of data of the snapshot acquired periodically, and to control to send the plurality of data of the snapshot acquired periodically to the another storage controller.

5. The storage controller according to claim 2, wherein:
the processor is configured to manage the first type data for the block and does not manage the second type data for the block, if a total size of a plurality of the second type data of the block is more than a threshold value.

6. A storage system comprising:
a controller configured to:
manage a primary volume, a virtual volume and a snapshot of the primary volume at a certain timing, the primary volume storing data sent from a host system and being paired with a secondary volume in another storage system, the virtual volume storing differential data of the snapshot to be sent to the another storage controller;
manage a plurality of storage devices configured to store data
manage the differential data, including a first type data and a second type data in a plurality of data of the snapshot based on an amount of each type of the differential data, the second type data having a size smaller than a size of the first type data; and
control to send the plurality of data of the snapshot to the another controller so that the another storage system stores the plurality of data of the snapshot in the secondary volume.

7. The storage system according to claim 6, wherein:
the controller is configured to manage the first type data and the second type data for a block of a plurality of blocks, each of the plurality of blocks has a certain length and is managed by the controller for storing the plurality of data of the snapshot in the primary volume and/or the virtual volume.

8. The storage system according to claim 7, wherein:
the controller is configured to control to send the first type data or the second type data for the block of the plurality of blocks for sending the plurality of data of the snapshot to the another storage system.

9. The storage system according to claim 6, wherein:
the controller is configured to control to acquire the snapshot periodically, to manage the first type data and the second type data in the plurality of data of the snapshot acquired periodically, and to control to send the plurality of data of the snapshot acquired periodically to the another storage system.

10. The storage system according to claim 7, wherein:
the controller is configured to manage the first type data for the block and does not manage the second type data for the block, if a total size of a plurality of the second type data of the block is more than a threshold value.

11. A method of operating a storage controller comprising a processor, the method comprising:
managing, via the processor, a primary volume, a virtual volume and a snapshot of the primary volume at a certain timing, the primary volume storing data sent from a host system and being paired with a secondary volume in another storage controller, the virtual volume storing differential data of the snapshot to be sent to the another storage controller;
managing, via the processor, the differential data, including a first type data and a second type data in a plurality of data of the snapshot based on an amount of each type of the differential data, the second type data having a size smaller than a size of the first type data; and
controlling, via the processor, to send the plurality of data of the snapshot to the another storage controller so that the another storage controller stores the plurality of data of the snapshot in the secondary volume.

12. The method according to claim 11, further comprising:
managing, via the processor, the first type data and the second type data for a block of a plurality of blocks, each of the plurality of blocks has a certain length and is managed by the processor for storing the plurality of data of the snapshot in the primary volume and/or the virtual volume.

13. The method according to claim 12, further comprising:
controlling, via the processor, to send the first type data or the second type data for the block of the plurality of blocks for sending the plurality of data of the snapshot to the another storage controller.

14. The method according to claim 11, further comprising:
controlling, via the processor, to acquire the snapshot periodically, managing the first type data and the second type data in the plurality of data of the snapshot acquired periodically, and controlling to send the plurality of data of the snapshot acquired periodically to the another storage controller.

15. The method according to claim 12, further comprising:
managing, via the processor, the first type data for the block and not managing the second type data for the block, if a total size of a plurality of the second type data of the block is more than a threshold value.

16. A method of operating a storage system comprising a controller and a plurality of storage devices, the method comprising:
managing, via the controller, a primary volume, a virtual volume and a snapshot of the primary volume at a certain timing, the primary volume storing data sent from a host system and being paired with a secondary volume in another storage system, the virtual volume storing differential data of the snapshot to be sent to the another storage system;
storing data in a plurality of storage devices according to an operation of the controller;
managing, via the controller, the differential data, including a first type data and a second type data in a plurality of data of the snapshot based on an amount of each type of the differential data, the second type data having a size smaller than a size of the first type data; and
controlling, via the controller, to send the plurality of data of the snapshot to the another controller so that the another storage system stores the plurality of data of the snapshot in the secondary volume.

17. The method according to claim 16, further comprising:
managing, via the controller, the first type data and the second type data for a block of a plurality of blocks, each of the plurality of blocks has a certain length and is managed by the controller for storing the plurality of data of the snapshot in the primary volume and/or the virtual volume.

18. The method according to claim 17, further comprising:
controlling, via the controller, to send the first type data or the second type data for the block of the plurality of blocks for sending the plurality of data of the snapshot to the another storage system.

19. The method according to claim 16, further comprising:
controlling, via the controller, to acquire the snapshot periodically, managing the first type data and the second type data in the plurality of data of the snapshot acquired periodically, and controlling to send the plurality of data of the snapshot acquired periodically to the another storage system.

20. The method according to claim 17, further comprising:
managing, via the controller, the first type data for the block and not managing the second type data for the block, if a total size of a plurality of the second type data of the block is more than a threshold value.

* * * * *